United States Patent
Wada et al.

(10) Patent No.: US 10,587,088 B2
(45) Date of Patent: Mar. 10, 2020

(54) SOLID-STATE LASER DEVICE

(71) Applicant: FUJIFILM Corporation, Tokyo (JP)

(72) Inventors: Takatsugu Wada, Kanagawa (JP);
Hiroyasu Ishii, Kanagawa (JP);
Tomoki Inoue, Kanagawa (JP); Keiji Tsubota, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/200,063

(22) Filed: Nov. 26, 2018

(65) Prior Publication Data

US 2019/0097379 A1 Mar. 28, 2019

Related U.S. Application Data

(63) Continuation of application No. PCT/JP2017/019806, filed on May 26, 2017.

(30) Foreign Application Priority Data

May 27, 2016 (JP) .................................. 2016-105869
Jul. 1, 2016 (JP) .................................. 2016-131364

(51) Int. Cl.
*H01S 3/093* (2006.01)
*H01S 3/06* (2006.01)
(Continued)

(52) U.S. Cl.
CPC ............ *H01S 3/093* (2013.01); *H01S 3/0602* (2013.01); *H01S 3/025* (2013.01); *H01S 3/042* (2013.01);
(Continued)

(58) Field of Classification Search
CPC ........ H01S 3/093; H01S 3/025; H01S 3/1623; H01S 3/0602; H01S 3/06; H01S 3/042; H01S 3/02; H01S 3/11
See application file for complete search history.

(56) References Cited

U.S. PATENT DOCUMENTS 3,979,696 A * 9/1976 Buchman ................ H01S 3/093
372/70
5,805,625 A 9/1998 Langner et al.
(Continued)

FOREIGN PATENT DOCUMENTS

EP 3125377 A1 2/2017
JP 60-31264 A 2/1985
(Continued)

OTHER PUBLICATIONS

International Preliminary Report on Patentability and Written Opinion of the International Searching Authority (FORMS PCT/IB/326, PCT/IB/373 and PCT/ISA/237) for International Application No. PCT/JP2017/019806, dated Dec. 6, 2018, with English translation.
(Continued)

*Primary Examiner* — Xinning(Tom) Niu
(74) *Attorney, Agent, or Firm* — Birch, Stewart, Kolasch & Birch, LLP

(57) ABSTRACT

A solid-state laser device includes a laser rod made of an alexandrite crystal; a flash lamp that outputs excitation light for exciting the laser rod, a glass tube for a lamp being made of quartz glass that at least blocks deep ultraviolet light having a wavelength of 200 nm to 300 nm, and transmits visible light having a wavelength of 400 nm or more; and a laser chamber that contains a tubular reflector that includes a hole part containing at least a portion of the laser rod or a portion of the flash lamp and is made of a porous material of polytetrafluoroethylene, an inner wall surface of the hole part being as a reflecting surface that reflects the excitation light.

21 Claims, 14 Drawing Sheets

(51) Int. Cl.
    *H01S 3/042*   (2006.01)
    *H01S 3/11*    (2006.01)
    *H01S 3/04*    (2006.01)
    *H01S 3/16*    (2006.01)
    *H01S 3/08*    (2006.01)
    *H01S 3/106*   (2006.01)
    *H01S 3/02*    (2006.01)

(52) U.S. Cl.
    CPC ............. *H01S 3/0407* (2013.01); *H01S 3/061* (2013.01); *H01S 3/0623* (2013.01); *H01S 3/08004* (2013.01); *H01S 3/08054* (2013.01); *H01S 3/106* (2013.01); *H01S 3/11* (2013.01); *H01S 3/1623* (2013.01); *H01S 3/1633* (2013.01)

(56) References Cited

U.S. PATENT DOCUMENTS

| | | | |
|---|---|---|---|
| 2003/0035282 A1* | 2/2003 | Tao ........................ | H01J 61/025 362/84 |
| 2003/0095581 A1 | 5/2003 | Edwards | |
| 2004/0240496 A1 | 12/2004 | Fujikawa et al. | |
| 2013/0301662 A1* | 11/2013 | Stuart ................. | H01S 3/08095 372/5 |
| 2017/0201058 A1 | 7/2017 | Murakoshi | |

FOREIGN PATENT DOCUMENTS

| | | | | |
|---|---|---|---|---|
| JP | 1-304790 A | | 12/1989 | |
| JP | 3-231481 A | | 10/1991 | |
| JP | 4-23479 A | | 1/1992 | |
| JP | 4-53282 A | | 2/1992 | |
| JP | H 0453282 A | * | 2/1992 | ............ H01S 3/092 |
| JP | 5-218530 A | | 8/1993 | |
| JP | 7-235714 A | | 9/1995 | |
| JP | H 07235714 A | * | 9/1995 | ............ H01S 3/092 |
| JP | 11-87806 A | | 3/1999 | |
| JP | 11-150316 A | | 6/1999 | |
| JP | 2003-8118 A | | 1/2003 | |
| JP | 2003-198011 A | | 7/2003 | |
| JP | 2005-158995 A | | 6/2005 | |
| JP | 2007-96063 A | | 4/2007 | |
| JP | 2011-18815 A | | 1/2011 | |
| JP | 2015-192044 A | | 11/2015 | |
| WO | WO 03/069738 A1 | | 8/2003 | |
| WO | WO 2016/051664 A1 | | 4/2016 | |

OTHER PUBLICATIONS

International Search Report (Form PCT/ISA/210) for International Application No. PCT/JP2017/019806, dated Jul. 25, 2017, with English translation.

* cited by examiner

SOLID-STATE LASER DEVICE

CROSS-REFERENCE TO RELATED APPLICATIONS

This application is a continuation application of International Application No. PCT/JP2017/019806, filed May 26, 2017, the disclosure of which is incorporated herein by reference in its entirety. Further, this application claims priority from Japanese Patent Application No. 2016-105869, filed May 27, 2016, and Japanese Patent Application No. 2016-131364, filed Jul. 1, 2016, the disclosures of which are incorporated herein by reference in their entirety.

BACKGROUND OF THE INVENTION

1. Field of the Invention

The present invention relates to a solid-state laser device using a laser rod made of alexandrite as a solid-state laser medium.

2. Description of the Related Art

In the related art, solid-state laser devices using a solid-state laser medium, such as Nd-doped yttrium aluminum garnet (Nd-YAG) are configured such that excitation light is generated from an excitation lamp and the excitation medium is irradiated with the laser light to excite the light and to emit laser light. Then, in order to efficiently condense the excitation light from the excitation lamp on the laser medium, a reflective tube of which a cross-section of an inner hole has an elliptical shape or a double elliptical shape is provided so as to wrap around the excitation lamp and the laser medium.

Such a reflective tube should be capable of reflecting the excitation light with high reflectivity. As a material of the reflective tube, JP1995-115237A (JPH07-115237A) suggests using mica ceramics, or fluororesin containing barium sulfate, for example, in 10% to 20% by weight. Additionally, JP1995-235714A (JPH07-235714A) suggests using a porous body of polytetrafluoroethylene as a material of the reflective tube. In addition, the reflective tube is also referred to as a reflector, and an entire jig that contains the reflective tube and fixedly disposes the laser rod and the excitation lamp to excite a laser is also referred to as a laser chamber.

Meanwhile, JP2005-001923A discloses an excitation lamp used for a solid-state laser device in which a quartz glass tube provided with fine irregularities accompanying no micro crack can be used for the lamp to suppress uneven radiation and improve the durability of the excitation lamp.

JP2004-531445A and JP2008-019134A disclose borosilicate glass, in which the transmittance of ultraviolet light is suppressed, as glass suitable for a fluorescent lamp used for a backlight of a liquid crystal display.

On the other hand, in a solid-state laser device, in a case where dust or dirt adheres to an optical member surface, for example, an end face of the laser rod or a reflecting surface of a resonator mirror, there is a possibility that the energy of the laser light is concentrated on the portion and the rod end face or the mirror reflecting surface is damaged. In order to protect the resonator mirror of the laser rod from dust or sort, various suggestions for a structure in which these are sealed within a housing are made.

Meanwhile, an excitation light source, such as a flash lamp, which excites the laser rod, is consumables, and is required to be periodically replaced. For that reason, in order to make replacement work of the flash lamp easy, JP2015-192044A and JP2015-084401A and the like suggest solid-state laser devices in which the flash lamp portion of the laser chamber is exposed from the housing, and the flash lamp is allowed to be pulled out from the laser chamber without opening a lid part of the housing.

SUMMARY OF THE INVENTION

In the solid-state laser devices, the flash lamp is well known as the excitation lamp. Since the energy of the light output from the flash lamp is very large, and a voltage of several hundred volts to several kilovolts is applied to the flash lamp, much higher heat resistance and durability are required compared to a lamp used for a backlight of a liquid crystal display. For that reason, in the borosilicate glass described in JP2004-531445A and JP2008-019134A, the heat resistance is not sufficient, the thermal expansion coefficient of the borosilicate glass is about $5\times10^{-6}/°$ C., and is larger by one digit number than thermal expansion coefficient $0.5\times10^{-6}/°$ C. of quartz glass. Therefore, a volume change is too large with respect to an abrupt temperature change of the flash lamp, and the borosilicate glass breaks. Therefore, it is preferable to use the quartz glass with a higher heat resistance.

Meanwhile, by using a porous material of polytetrafluoroethylene (PTFE) as a material of the reflective tube as described in JP1995-235714A (JPH07-235714A), the excitation light can be reflected with extremely high reflectivity, and excitation efficiency can be improved.

Although the PTFE is a kind of resin, it is known that the PTFE is configured from C—F binding with extremely high binding energy, and the durability is markedly higher than resins having molecular binding, such as C—C binding, Si—C binding, and C—O binding.

However, the present inventors have found out that there is a problem that the output of a laser decreases with passage of time, in the solid-state laser devices using the laser rod made of alexandrite as the laser medium and using the laser chamber that contains the reflector made of the PTFE porous material. FIG. 8 illustrates results of durability tests performed by the present inventors regarding the solid-state laser devices including the laser rod made of alexandrite and the laser chamber that contains the reflector made of the PTFE porous material, and is a graph illustrating time-dependent changes in laser output. In the graph of FIG. 8, dashed lines are illustrated on a line of laser power initial values and a line reduced by 10% therefrom. It is clear from the graph that the output decreases greatly at the time of passage of 1500 hours (a region B enclosed by a dashed line). In addition, in a case where the related-art YAG is used as the laser medium, the absorption peak of YAG has a relatively high wavelength of 800 nm, while the YAG laser rod itself is damaged at a wavelength of 400 nm or less. Therefore, a flash lamp including a glass tube for a lamp made of quartz glass that cuts the wavelength of 400 nm or less is used. However, since the absorption wavelength of alexandrite has two absorption ranges of a wavelength range of about 380 nm to 460 nm centered on 420 nm, and a wavelength range of about 540 nm to 640 nm centered on 600 nm, and particularly, the wavelength range of about 380 nm to 460 nm centered on 420 nm is important for laser excitation, in order to efficiently perform excitation, the quartz glass, which transmits the 400 nm wavelength that is not used in the case of the YAG laser, is used.

The invention has been made in view of the above circumstances, and an object thereof is to provide a solid-state laser device, using a laser rod made of alexandrite well used in a small-sized laser and including a laser chamber that contains a reflector made of a PTFE porous material, which is capable of stably performing laser oscillation for a long period of time.

A solid-state laser device of the invention is a solid-state laser device comprising a laser rod made of an alexandrite crystal; a flash lamp that outputs excitation light for exciting the laser rod, a glass tube for a lamp being made of quartz glass that at least blocks deep ultraviolet light having a wavelength of 200 nm to 300 nm, and transmits visible light having a wavelength of 400 nm or more; and a laser chamber that contains a tubular reflector that includes a hole part containing at least a portion of the laser rod or a portion of the flash lamp and is made of a porous material of polytetrafluoroethylene, an inner wall surface of the hole part being as a reflecting surface that reflects the excitation light.

In the solid-state laser device of the invention, it is preferable that the glass tube for a lamp is a glass tube in which a change in transmittance of light having a wavelength of 400 nm is within 5% while 4 million shots to 14 million shots are performed in a case where the flash lamp is driven.

Here, 4 million shots and 14 million shots are the numbers of shots from an initial state (non-shot) of the flash lamp. In the following, the same applies to the case of " . . . shots".

In the solid-state laser device of the invention, it is preferable the flash lamp is subjected to aging processing of 1 million shots or more.

It is preferable that the solid-state laser device of the invention further comprises an inlet/outlet mechanism for cooling water that cools the flash lamp and the laser rod.

In the solid-state laser device of the invention, it is preferable that the hole part of the reflector is provided with a flow tube having a first fluid flow part into which the flash lamp is inserted, and a second fluid flow part into which the laser rod is inserted, and the flow tube is made of quartz glass that blocks the deep ultraviolet light having a wavelength of 200 nm to 300 nm and transmits the visible light having a wavelength of 400 nm or more.

In the solid-state laser device of the invention, it is preferable that the hole part of the reflector is provided with a flow tube having a fluid flow part into which the flash lamp is inserted, and the flow tube is made of quartz glass that blocks the deep ultraviolet light having a wavelength of 200 nm to 300 nm and transmits the visible light having a wavelength of 400 nm or more.

In the solid-state laser device of the invention, it is preferable that the flash lamp has a columnar shape, the flash lamp and the laser rod are disposed parallel to each other in the hole part, and a difference between a shortest distance from a surface of the glass tube for a lamp of the flash lamp to the inner wall surface of the hole part and a shortest distance from a surface of the laser rod to the inner wall surface of the hole part is less than ±1 mm.

In the solid-state laser device of the invention, it is preferable that the flash lamp is disposed in the hole part at a position where a shortest distance from a surface of the glass tube for a lamp of the flash lamp to the inner wall surface of the hole part is 5 mm or less and 1 mm or more.

In the solid-state laser device, it is preferable that the flash lamp has a columnar shape, and the laser rod and the flash lamp satisfies 1.5 $\varphi_L \leq \varphi_F$ in a case where a diameter of the laser rod is defined as $\varphi_L$ and a diameter of the flash lamp is defined as $\varphi_F$.

The solid-state laser device is a solid-state laser device comprising a linear resonator in which an output mirror and a rear mirror are disposed on a straight line, the laser rod being disposed on an optical path of the resonator; and optical members at least including a Q-switch. The resonator, the laser rod, and the optical members are provided on a common base and are contained in a housing having the base as a portion. A holding part is provided to hold the flash lamp parallel to the laser rod on a side of the laser rod opposite to the base. The optical members including the Q-switch are disposed between the laser rod and the rear mirror. An upper end position of the output mirror is at a position lower than a lower end position of the flash lamp held by the holding part, with the base as a reference. The holding part holds the flash lamp so as to be capable of being inserted and extracted with respect to the output mirror side in a longitudinal direction of the flash lamp.

In the solid-state laser device of the invention, it is preferable that the output mirror is formed such that a reflective coating of a resonator surface of the output mirror is provided up to the upper end position.

In the solid-state laser device of the invention, it is preferable that upper end positions of the Q-switch and the rear mirror are higher than the lower end position of the flash lamp held by the holding part with the base as a reference.

It is preferable that the solid-state laser device of the invention further comprises a shutter as the optical member, the shutter is provided between the laser rod and the Q-switch, and a partition plate having an opening in the optical path is provided between the laser rod and the shutter inside the housing.

In the solid-state laser device of the invention, it is preferable that the housing has a first housing part that houses the output mirror and the laser rod, and a second housing part that houses the rear mirror and the optical members, and the first housing part includes a first lid that opens the first housing part, the second housing part includes a second lid that opens the second housing part, and the first housing part and the second housing part are openable independently.

In the solid-state laser device of the invention, it is preferable that a material forming the first lid and a material forming portions of the first housing part other than the first lid have linear thermal expansion coefficients of the same order.

In the solid-state laser device of the invention, it is preferable that the holding part includes a hole part that houses the flash lamp, and has a butting structure for the flash lamp in which a power source terminal is provided at an end of the hole part on the rear mirror side.

It is preferable that the solid-state laser device of the invention further comprises a pipe that supplies a cooling medium for cooling the flash lamp to the holding part, and the pipe is disposed to extend in a direction perpendicular to the base along a side surface of the housing from a hole provided in the base and is connected to the holding part.

In the solid-state laser device of the invention, it is preferable that the hole part of the laser chamber has a columnar shape shorter than a major-axis length of the laser rod, the laser rod is inserted through the hole part of the laser chamber, and is supported by the laser chamber in a state where both end parts of the laser rod are exposed from the hole part of the laser chamber, an O-ring is provided at a root of at least one of both the end parts of the laser rod exposed from the hole part, and a cover member that hinders incidence of stray light generated within the housing onto the O-ring is further provided on a side surface of the laser rod closer to an end face side than the O-ring.

In the configuration including the O-ring, it is preferable that the solid-state laser device further comprises an O-ring retaining plate between the cover member and the O-ring and the O-ring retaining plate is made of at least one of ceramics, glass, or fluororesin.

In the solid-state laser device of the invention, it is preferable that the hole part of the laser chamber has a columnar shape shorter than a major-axis length of the laser rod, the laser rod is inserted through the hole part of the laser chamber, and is supported by the laser chamber in a state where both end parts of the laser rod are exposed from the hole part of the laser chamber, an O-ring is provided at a root of at least one of both the end parts of the laser rod exposed from the hole part, and the O-ring is made of fluororesin.

In the solid-state laser device of the invention, it is preferable that the laser rod has an antireflection film on an end face thereof and has a chamfered part at a peripheral edge of the end face, and an opening defining part that constitutes an opening having a diameter smaller than a diameter of an outer periphery of the end face is provided at a position that faces at least one end face of the laser rod, and an end face protecting member is provided to limit a laser light path region in the end face of the laser rod to a region inside the outer periphery of the end face.

In the solid-state laser device of the invention, it is preferable that a distance from an optical member disposed closest to the laser rod side among the optical members to the rear mirror is shorter than a length of the flash lamp.

Since the solid-state laser device of the invention comprises the laser rod made of the alexandrite crystal; the flash lamp that outputs the excitation light for exciting the laser rod, the glass tube for a lamp being made of the quartz glass that at least blocks the deep ultraviolet light having a wavelength of 200 nm to 300 nm, and transmits the visible light having a wavelength of 400 nm or more; and the laser chamber that contains the tubular reflector that includes the hole part containing at least a portion of the laser rod and a portion of the flash lamp and is made of the porous material of polytetrafluoroethylene, the inner wall surface of the hole part being as the reflecting surface that reflects the excitation light, damage to the reflector resulting from the deep ultraviolet light having a wavelength of 200 nm to 300 nm can be suppressed, and consequently, time-dependent changes of the laser output can be suppressed.

DESCRIPTION OF THE PREFERRED EMBODIMENTS

Figure 9:
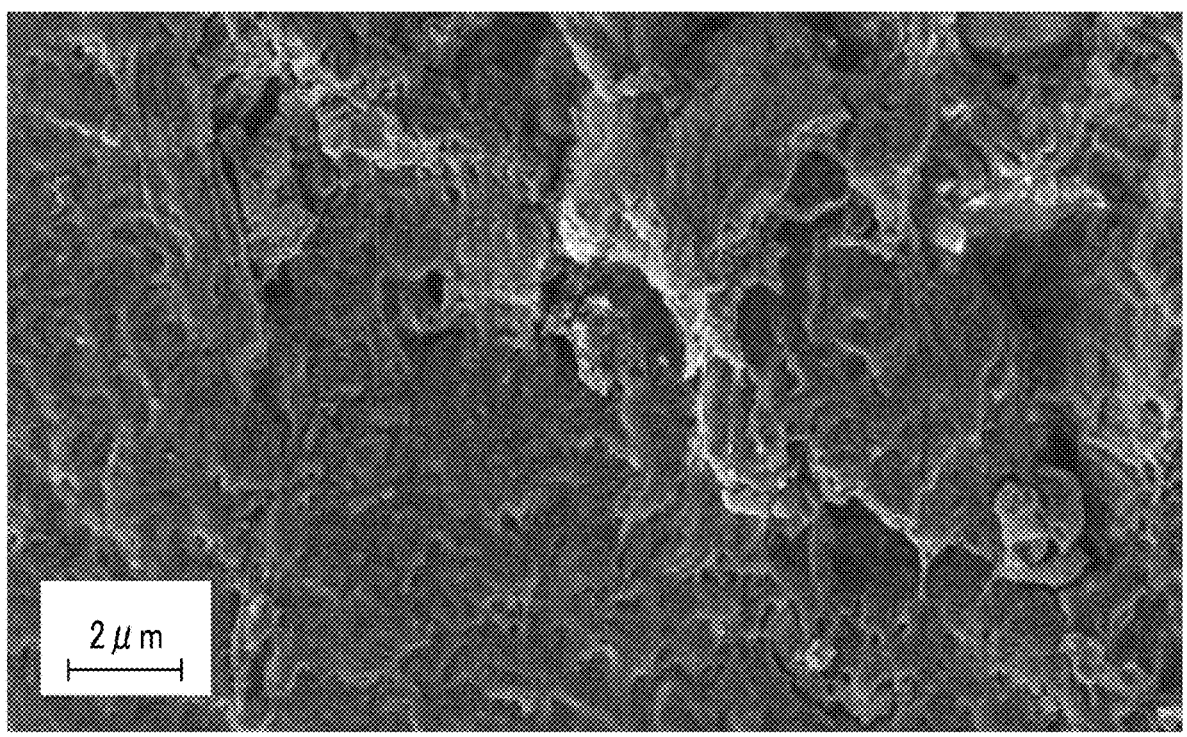
FIG. 9 is an SEM image of a reflector inner wall surface at an initial stage.
Figure 10:
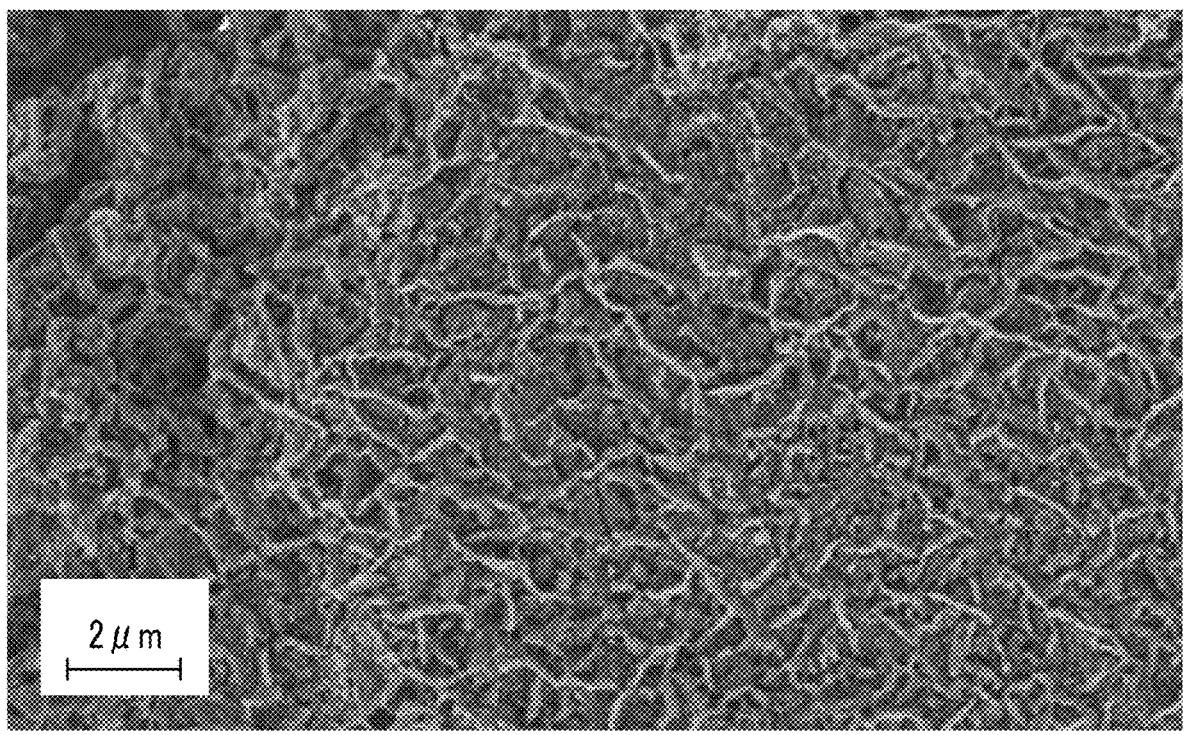
FIG. 10 is an SEM image of the reflector inner wall surface after 2000-hour use.
Figure 11:
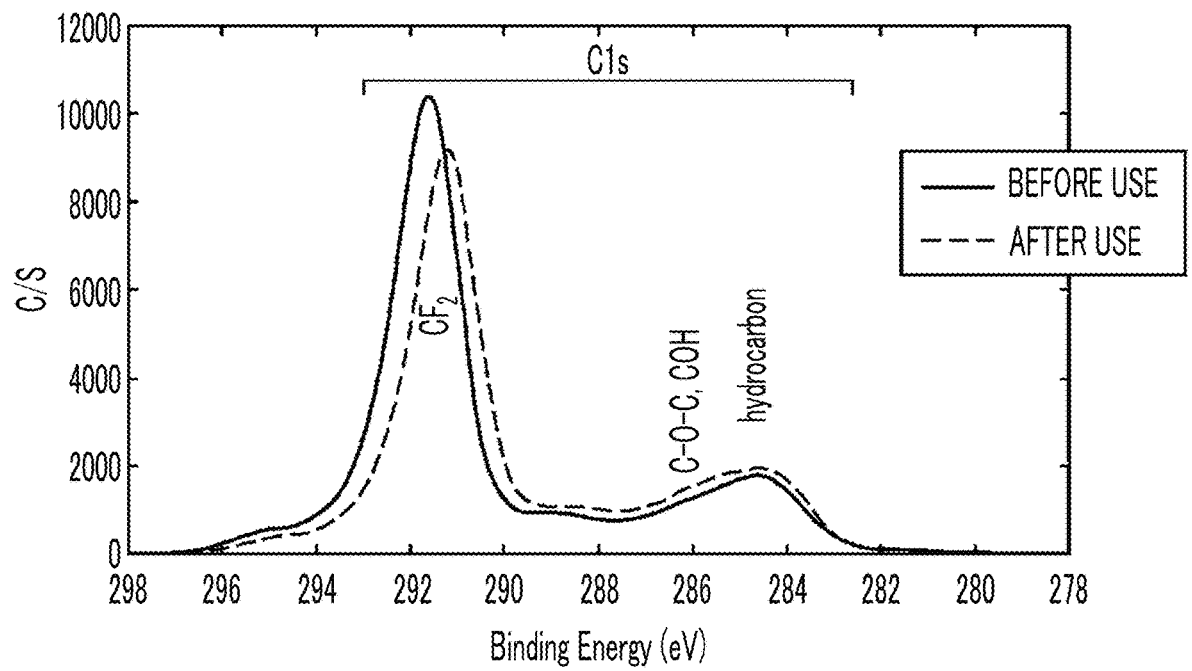
FIG. 11 is a view illustrating carbon C1s analysis results of the reflector inner wall surface at the initial stage and after 2000-hour use.

The present inventors have made an intensive study on the causes of a decrease in the laser output of a solid-state laser device over time. First, states before use and after passage of 2000 hours are observed regarding an inner wall surface of a reflector. FIG. 9 and FIG. 10 are respectively scanning electron microscope images of the inner wall surface before use and after 2000-hour use. It can be seen that a relatively smooth surface before use has a number of extremely fine irregularities formed thereon after use and the surface is brought into a rough state. It is assumed that a decrease in laser excitation energy resulting from deterioration of the inner wall surface (reflecting surface) of the reflector is a factor. Moreover, carbon (C1s) was analyzed by X-ray photoelectron spectroscopy on the inner wall surface before use and after passage of 2000 hours. The results are illustrated in FIG. 11. In FIG. 11, a solid line represents a state before use, and a dashed line represents a state after passage of 2000 hours (after use). In FIG. 11, the peak of $CF_2$ becomes small after use and is shifted to a low energy side on a right side. As a result, it is assumed that desorption of fluorine (F) occurs, that is, C—F binding constituting PTFE is broken. The binding energy of the C—F binding is 116 kcal/mol, and the wavelength having energy equivalent to the dissociation energy of the C—F binding is about 250 nm. Meanwhile, a glass tube for a lamp of a flash lamp used in the above solid-state laser device studied by the present inventors is quartz glass that transmits a wavelength of 400 nm and has a transmittance of about 25% with respect to light having a wavelength of about 250 nm equivalent to the above binding energy. From the above, the present inventors have obtained the knowledge that, as deep ultraviolet light (deep ultraviolet) having a wavelength of about 250 nm output from the flash lamp is incident on the reflecting surface of a reflector, the C—F binding of PTFE is broken, the reflecting surface is roughened, and reflectivity is lowered. The following invention has been reached on the basis of this knowledge.

Figure 1:
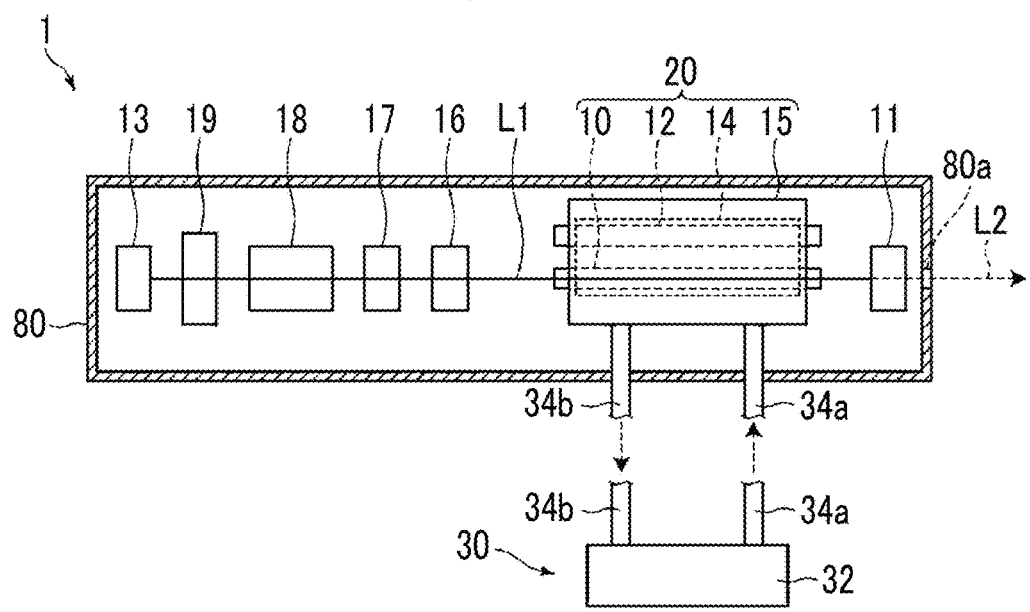
FIG. 1 is a plan view schematically illustrating a configuration inside the solid-state laser device of a first embodiment.
Figure 2:
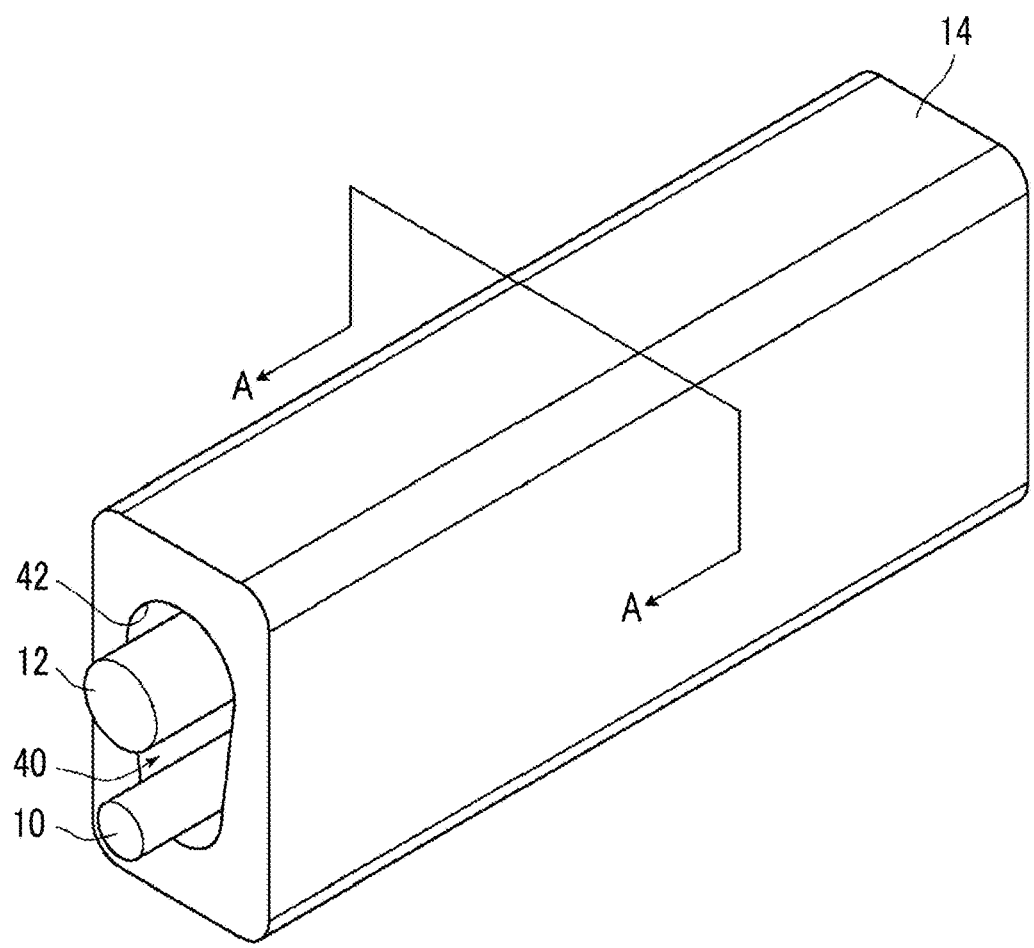
FIG. 2 is a perspective view schematically illustrating a laser rod, an excitation lamp, and a reflector of the first embodiment.
Figure 3:
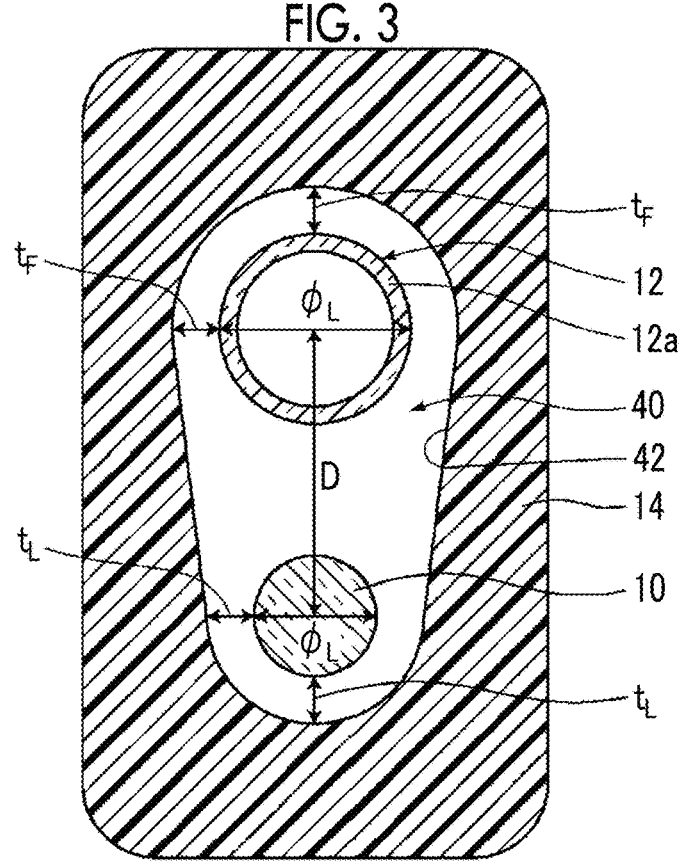
FIG. 3 is a cross-sectional view taken along line A-A of FIG. 2.

Hereinafter, embodiments of the invention will be described in detail with reference to the drawings. FIG. 1 is a plan view schematically illustrating a configuration inside a solid-state laser device 1 of a first embodiment. FIG. 2 is a perspective view schematically illustrating a laser rod 10, a flash lamp 12, and a reflector 14 of the embodiment. FIG. 3 is a cross-sectional view in an A-A cross-section perpendicular to a length direction of the laser rod 10 of FIG. 2. In addition, in order to make visibility easy, scales or the like of respective constituent elements in the drawings are appropriately made different from actual scales.

The solid-state laser device 1 of the embodiment includes a light source unit 20 provided with the laser rod 10 made of alexandrite; the flash lamp 12 that outputs excitation light for exciting the laser rod 10, a glass tube 12a for a lamp being made of quartz glass that at least blocks deep ultraviolet light having a wavelength of 200 nm to 300 nm (200 nm or more and 300 nm or less), and transmits visible light having a wavelength of 400 nm or more; and a laser chamber 15 that contains a tubular reflector 14 that includes a hole part 40 containing at least a portion of the laser rod 10 or a portion of the flash lamp 12 and is made of a porous material of polytetrafluoroethylene, an inner wall surface 42 of the hole part 40 being a reflecting surface that reflects the excitation light. Here, the visible light is light having a wavelength of 400 nm to 780 nm or less.

The solid-state laser device 1 further includes a pair of mirrors 11 and 13, a polarizer 16, a shutter 17, a Q-switch 18, and a wedge prism pair 19 that constitute a resonator; a housing 80 that houses these; and a cooler 30 connected to the laser chamber 15 from the outside of the housing.

In the present embodiment, the pair of mirrors 11 and 13 are disposed to face each on a straight line other with the laser rod 10 interposed therebetween and constitutes a linear resonator. The mirror 116 is a partial transmission mirror and functions as a so-called output mirror that outputs laser light. The mirror 13 is a high-reflection mirror and functions as a so-called rear mirror. Hereinafter, there is a case where the mirrors 11 and 13 are referred to as the output mirror 11 and the rear mirror 13, respectively.

The polarizer 16 takes out only a component that is linearly polarized in a predetermined direction from oscillated laser light. The shutter 17 controls the emission of the laser light and is controlled for opening and closing to mechanically block the emission of the laser light. The Q-switch 18 performs a so-called Q-switch operation so as to generate high-output pulsed laser light.

The housing 80 is formed, for example, in a rectangular parallelepiped shape and has an opening 80a for taking out a laser L2 on a side wall that is a portion facing the output mirror 11.

In the solid-state laser device 1, in a case where the above Q-switch 18 is brought into a light blocking state to turn on the flash lamp 12, the laser rod 10 is excited with the excitation light emitted from the flash lamp, and a strong inverted distribution state is formed. In a case where the Q-switch 18 is brought into a light passing state after being brought into this light blocking state, the light stimulated and emitted from the laser rod 10 resonates between the mirrors 11 and 13, turns into high-output giant pulse, is transmitted through the output mirror 11, and is emitted out of the resonator. In addition, the flash lamp 12 and the laser rod 10 that generate heat are cooled by a cooling medium that flows through the reflector 14. In addition, the solid-state laser device of the invention is not limited to the device that generates the pulsed laser light and may be constituted as a device that performs a continuous wave (CW) operation.

Hereinafter, the light source unit 20 will be described in detail.

The laser rod 10 is formed by machining the alexandrite crystal ($Cr:BeAl_2O_3$) in a rod shape. In addition, here, the rod shape is a columnar shape in which a distance between two disks serving as end faces is longer than the diameter of the disks. The laser rod 10 receives the light energy from the flash lamp 12 and functions as a laser medium that amplifies light having a specific wavelength. Light L1 stimulated and emitted from the laser rod 10 is amplified while resonating within the resonator constituted of the mirrors 11 and 13 and is then output as the laser L2 (FIG. 1).

In order to reduce the size of the entire device, it is preferable that the laser rod 10 has a small diameter and a short length. Since the energy density within a surface can be enhanced by making the diameter of the laser rod small, it is possible to shorten pulse width, and since resonator length can be shortened by making the length of the laser rod short, it is possible to shorten the pulse width. Since the alexandrite crystal is expensive, making the diameter of the laser rod small and making the length of the laser rod short has a great effect also in terms of cost. It is preferable that a diameter (hereinafter referred to as "rod diameter") $\varphi_L$ of a cross-section (circular cross-section) perpendicular to the length direction of the laser rod 10, is 4 mm or less. The rod diameter $\varphi_L$ is more preferably 3 mm or less, and still more preferably 2.5 mm or less. Additionally, the rod length of the laser rod is preferably 75 mm or less, and more preferably 60 mm or less.

The flash lamp 12 is an excitation light source that supplies energy for stimulated emission to the laser rod 10. For example, one in which facing electrodes are disposed in the rod-shaped (columnar) glass tube 12a for a lamp and Xe gas is enclosed can be used for the flash lamp 12. The flash lamp 12 includes, for example, terminals (not illustrated) at both ends of the rod-shaped glass tube 12a for a lamp, respectively, and the terminals are connected to a power source (not illustrated) disposed outside the housing 80.

The flash lamp 12 is made of quartz glass in which the glass tube 12a for a lamp blocks the deep ultraviolet light having a wavelength of 200 nm to 300 nm and transmits the visible light having a wavelength of 400 nm or more. In addition, the quartz glass used here transmits at least the light having a wavelength of 400 nm to 780 nm. It is preferable that the glass tube 12a for a lamp transmits a wavelength of 380 nm to 780 nm and blocks a wavelength of 300 nm or less. In the present specification, the term "transmits" a certain wavelength λ means that the transmittance of light having the wavelength λ is 80% or more, and the term "blocks" a certain wavelength λ means that the transmittance of light having the wavelength λ is "5% or less. In addition, as the glass tube 12a for a lamp, the transmittance of light having a wavelength of 400 nm to 780 nm is preferably 85% or more, and more preferably 90% or more. Additionally, the transmittance of the deep ultraviolet light having a wavelength of 200 nm to 300 nm is preferably 3% or less, and more preferably 1% or less.

As the quartz glass that satisfies the above conditions, for example, quartz glass M382S Plus made by Heraeus Co., Ltd, can be mentioned.

It is preferable that the glass tube 12a for a lamp is subjected to aging processing. It is preferable that the aging processing is at least 1 million shots (28 hours) or more and 4 million shots (about 110 hours) or less. It became clear from the investigation of the present inventors that the light transmittance of the glass tube 12a for a lamp made of the quartz glass decreases abruptly from an initial state to 1 million shots (examples to be described below). By virtue of this aging processing, the glass tube 12a for a lamp can be a glass tube, in which a change in transmittance of light having a wavelength of 400 nm is within 5% while 4 million shots to 14 million shots are performed in a case where the flash lamp 12 is driven. Here, one shot refers to one flash that causes the flash lamp to emit light once. Additionally, here, a relationship between the number of shots and driving time is converted in a case where the flash lamp is driven at 10 Hz.

The length of the flash lamp 12 may be appropriately determined in accordance with the length of the laser rod 10. Even in a case where the distance between the electrodes of the flash lamp 12 is made longer than the laser rod 10, the excitation light is not absorbed by the laser rod 10 and result in loss. Therefore, it is preferable that the distance between the electrodes is formed to be about the same as the light receiving length of the laser rod 10. Therefore, in a case where the length of the laser rod 10 is 75 mm, the total length of the flash lamp 12 is about 120 mm, and in a case where the length of the laser rod 10 is 60 mm or less, the total length of the flash lamp 12 is about 100 mm. In addition, the length of the flash lamp 12 is defined as a length in a longitudinal direction including the terminals. A diameter (hereinafter referred to as "lamp diameter") $\varphi_F$ of the flash lamp 12 may be appropriately determined in accordance with the rod diameter $\varphi_L$. In a case where the lamp diameter $\varphi_F$ is larger than the rod diameter $\varphi_L$, the proportion of the most efficient excitation light, which directly reaches the laser rod 10 from the flash lamp 12, decreases. Therefore, generally, the lamp diameter and the rod diameter are made to be about the same. However, in a case where the lamp diameter is made to be about the same as that in a case where the rod diameter is as small as 3 mm or less, the current density of the flash lamp 12 becomes high, and the lifespan of the flash lamp 12 becomes remarkably short. In such a case, it is preferable that the lamp diameter $\varphi_F$ is, for example, 1.5 times or more the rod diameter $\varphi_L$, such as about 5 mm. That is, it is preferable that the lamp diameter and the rod diameter satisfy 1.5 $\varphi_L \leq \varphi_F$.

The entire reflector 14 is constituted of a porous material of PTFE, that is, is constituted of only a porous material of PTFE. As the reflector, in the related art, a reflector having a reflecting surface formed by performing gloss coating on alumina ceramics, or a reflector formed by packing barium sulfate on the reflecting surface is predominant. However, in a case where a main body and the reflecting surface are constituted of separate materials, there is a problem that the reflecting surface deteriorates due to strain resulting from a difference between coefficients of thermal expansion. In the invention, since the reflector 14 that constitutes the reflecting surface (the inner wall surface 42 of the hole part 40) is made of only PTFE, such a problem does not occur.

Inside the reflector 14 (hole part 40), the light emitted from the flash lamp 12 is directly radiated to the laser rod 10 or is reflected by the inner wall surface 42, which is the reflecting surface, and is radiated to the laser rod 10.

The hole part 40 of the reflector 14 has a columnar shape shorter than the major-axis length of the laser rod 10, and the laser rod 10 and the flash lamp 12 are inserted through the hole part 40, are disposed parallel to each other within the hole part 40, and are supported in a state where both end parts thereof are respectively exposed from the hole part 40. Although the shape of the hole part 40 may be capable of housing at least portions of the laser rod 10 or the flash lamp 12, it is preferable that the entire excitation light output region of the flash lamp 12 is housed because the laser rod 10 is efficiently radiated with the excitation light.

In the reflector 14, in order to efficiently irradiate the laser rod 10 with the excitation light from the flash lamp 12, it is preferable that the distance D between the centers of the laser rod 10 and the flash lamp 12 is as close as possible. Excitation efficiency can be made extremely high by setting the center-to-center distance D to 7 mm or less.

The cooler 30, which is an cooling water introduction/delivery mechanism for introducing and delivering a cooling water for cooling the laser rod 10 and the flash lamp 12 to the hole part 40, is connected to the laser chamber 15 that is present in the reflector 14. The cooler 30 includes, for example, a cooling control unit 32 that contains the cooling water, such as pure water, and controls circulation of the cooling water, a pipe 34a, and a pipe 34b, and is connected to the laser chamber 15 via a pipe 34a serving as an outward trip for the cooling water and a pipe 34b serving as a return trip for the cooling water.

For example, the cooling medium supplied to the laser chamber 15 through the pipe 34a takes the heat of the laser rod 10 and the flash lamp 12 while passing through the reflector 14, and then returns to the cooling control unit 32 through the pipe 34b. Then, the cooling medium cooled in the cooling control unit 32 is circulated again between the laser chamber 15 and the cooling control unit 32.

In addition, as the cooling medium, alcohol, oil, and the like are available in addition to the pure water. However, since the reflector 14 is constituted of the porous material of PTFE in the present configuration, there is a risk that the alcohol and the oil may soak into PTFE. Therefore, in the present configuration, water, particularly, pure water is used as the cooling medium. In addition, since there is an effect that water has an effect of absorbing the deep ultraviolet light, the effect of further suppressing that the deep ultraviolet light having a wavelength of 200 nm to 300 nm slightly output from the flash lamp 12 is incident on the inner wall surface 42 of the reflector 14 can be obtained.

As illustrated as a cross-sectional shape perpendicular to the longitudinal direction of the hole part 40 in FIG. 3, it is preferable that the shape of the hole part 40 is configured such that a difference between a shortest distance $t_F$ of the inner wall surface 42 from the surface of the glass tube 12a for a lamp of the flash lamp 12 and a shortest distance $t_L$ of the inner wall surface 42 from the surface of the laser rod 10 is within ±1 mm. As illustrated in FIG. 3, in a case where the lamp diameter $\varphi_F$ is larger than the rod diameter $\varphi_L$ in order to make the distance $t_F$ and the distance $t_L$ equal to each other, an unsymmetrical cross-sectional shape is formed on a lamp insertion side and a rod insertion side of the hole part 40. It is preferable that a distance between the surface (a surface that forms an upper semicircle of the glass tube for a lamp in the cross-sectional view) of the glass tube 12*a* for a lamp of the flash lamp 12, which faces the inner wall surface 42, and the inner wall surface 42 is constant at $t_F$ in the entire region from viewpoints of the reflection efficiency of the excitation light and the cooling efficiency by the cooling water. Similarly, it is preferable that the distance between the surface (a surface that forms a lower semicircle of the laser rod in the cross-sectional view) of the laser rod 10, which faces the inner wall surface 42, and the inner wall surface 42 is constant at tL in the entire region from a viewpoint of the cooling efficiency.

Additionally, particularly, the distance $t_F$ between the glass tube 12*a* for a lamp of the flash lamp 12 and the inner wall surface 42 is preferably 5 mm or less and 1 mm or more, and more preferably 2 mm or less. For example, the distance $f_F$ can be 1.5 mm.

In addition, as the distance $t_F$ is smaller, the reflection efficiency of the excitation light can be enhanced, and the radiation efficiency of the excitation light to the laser rod can be improved. On the other hand, by setting the distance $t_F$ to 1 mm or more, the flow rate of the cooling water that can sufficiently cool the flash lamp can be maintained.

The solid-state laser device of the invention is not limited to the above embodiment.

Figure 4:
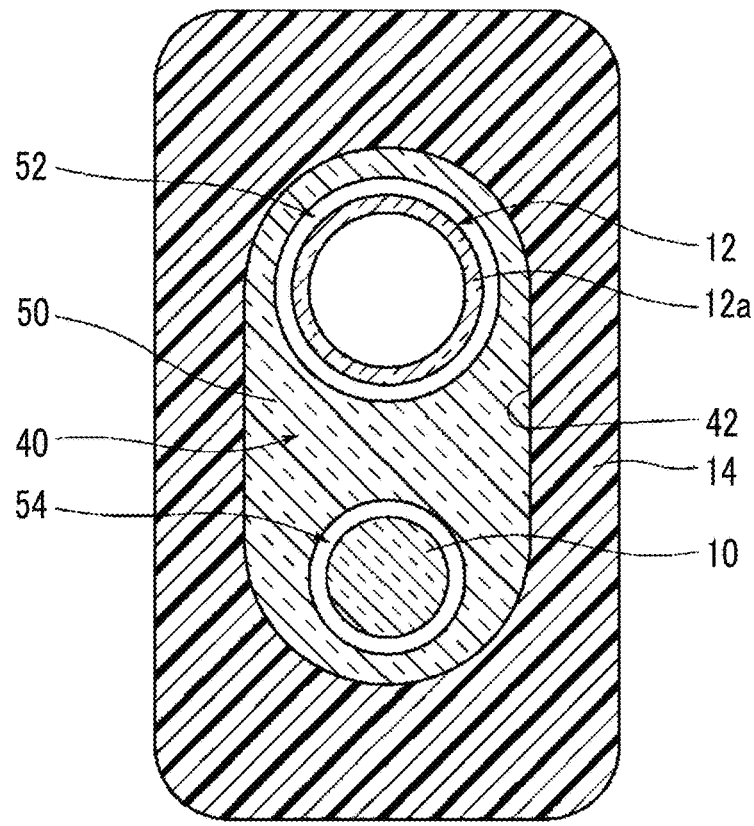
FIG. 4 is a cross-sectional view schematically illustrating another example of the reflector.
Figure 5:
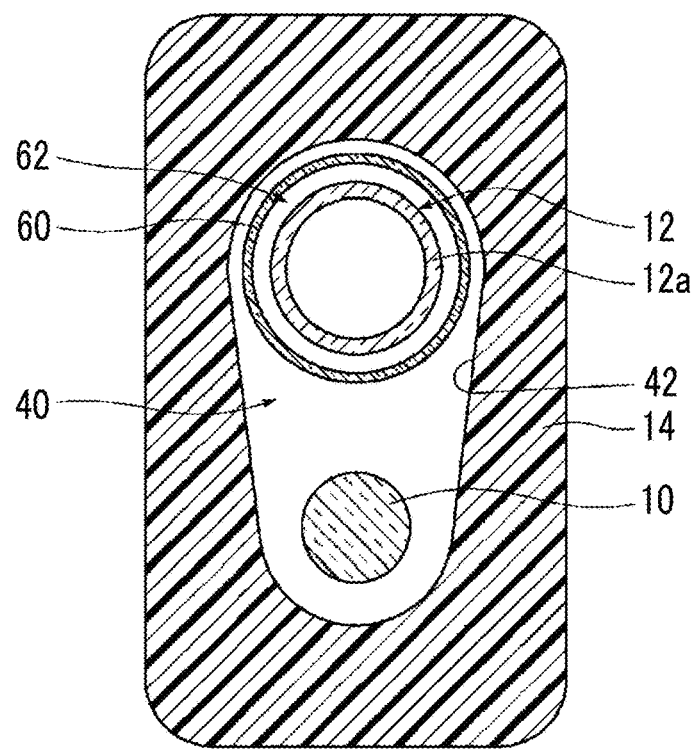
FIG. 5 is a cross-sectional view schematically illustrating still another example of the reflector.
Figure 6:
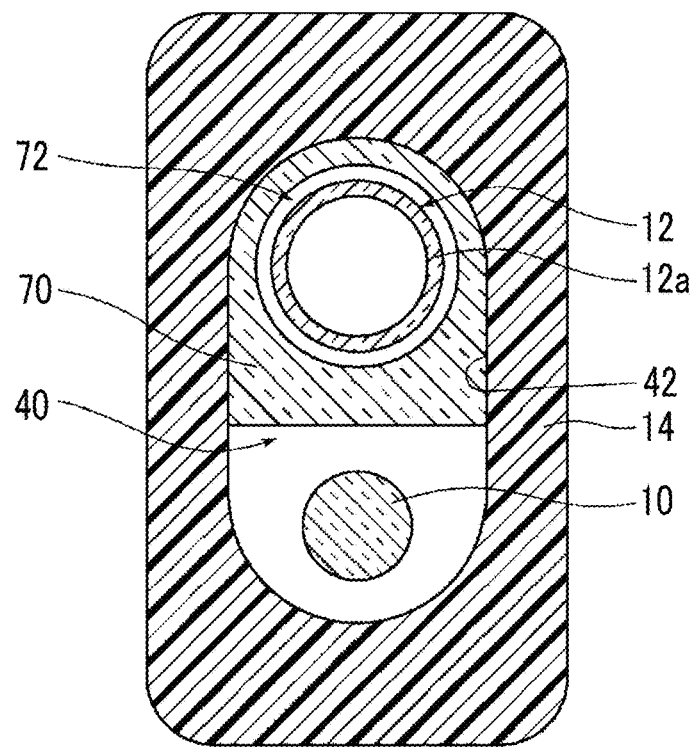
FIG. 6 is a cross-sectional view schematically illustrating a still further example of the reflector.

FIGS. 4 to 6 are cross-sectional views schematically illustrating other aspects in which the internal configurations of the reflectors 14 are different from each other.

An aspect illustrated in FIG. 4 is different from the configuration illustrated in the above FIG. 2 in that a flow tube 50 is inserted into the hole part 40 of the reflector 14. The flow tube 50 has a first fluid flow part 52 into which the flash lamp 12 is inserted, and a second fluid flow part 54 into which the laser rod 10 is inserted. The first fluid flow part 52 is a hollow part having a diameter larger than the diameter $\varphi_F$ of the flash lamp 12, and allows the cooling medium for cooling the flash lamp 12 to flow therethrough. The second fluid flow part 54 is a hollow part having a diameter larger than the diameter $\varphi_L$ of the laser rod 10, and allows the cooling medium for cooling the laser rod 10 to flow therethrough. The diameter of the hollow part of the first fluid flow part 52 is larger than the lamp diameter $\varphi_F$ by 2 mm to 10 mm, and preferably about 2 mm to 6 mm. Similarly, the diameter of the hollow part of the second fluid flow part 54 is preferably larger than the rod diameter $\varphi_L$ by 2 mm to 10 mm, and more preferably about 2 mm to 6 mm. By including such a flow tube 50, a sufficient cooling effect is exhibited and the amount of water can be suppressed.

Moreover, it is preferable that the flow tube 50 is made of the same quartz glass as the glass tube 12*a* for a lamp of the flash lamp 12 that blocks the deep ultraviolet light having a wavelength of 200 nm to 300 nm and transmits the visible light having a wavelength of 400 nm or more. Since both the glass tubes 12*a* for a lamp of the flash lamp 12 and the flow tube 50 has the effect of blocking the deep ultraviolet light having a wavelength of 200 nm to 300 nm, a double blocking effect can be obtained, and the incidence of the deep ultraviolet light of the light generated in the flash lamp 12 to the inner wall surface 42 of the reflector 14 can be more effectively suppressed.

The flow tube 50 illustrated in FIG. 4 may be made separately from the reflector 14 and may be fitted thereinto, or may be formed integrally with the reflector 14.

Additionally, as in an internal configuration of the reflector 14 illustrated in FIG. 5, a flow tube 60 having only one fluid flow part 62 into which the flash lamp 12 is inserted. The fluid flow part 62 is a hollow part having a diameter larger than the diameter $\varphi_F$ of the flash lamp 12, and allows the cooling medium for cooling the flash lamp 12 to flow therethrough. The diameter of the hollow part of the fluid flow part 62 is preferably larger than the lamp diameter $\varphi_F$ by 2 mm to 10 mm, and more preferably about 2 mm to 6 mm. During operation, the cooling water is caused to flow into the fluid flow part 62, and the cooling water for cooling the laser rod 10 is also caused to flow into the hole part 40 of the reflector 14 loaded with the flow tube 60.

Even in this case, it is preferable that the flow tube 60 is made of the same quartz glass as the glass tube 12*a* for a lamp of the flash lamp 12 that blocks the deep ultraviolet light having a wavelength of 200 nm to 300 nm and transmits the visible light having a wavelength of 400 nm or more. Since both the glass tubes 12*a* for a lamp of the flash lamp 12 and the flow tube 60 has the effect of blocking the deep ultraviolet light having a wavelength of 200 nm to 300 nm, a double blocking effect can be obtained, and the incidence of the deep ultraviolet light of the light generated in the flash lamp 12 to the inner wall surface 42 of the reflector 14 can be more effectively suppressed.

In the aspect of FIG. 5, the flow tube 60 has a hollow columnar shape. However, as illustrated in FIG. 6, a flow tube 70 including one fluid flow part 72 may be disposed so as to bury a flash lamp arrangement region (an upper part of the hole part 40) of the hole part 40 of the reflector 14. In this case, during operation, the cooling water is caused to flow into the fluid flow part 72 and the lower part of the hole part 40, and the cooling water for cooling the laser rod 10 is also caused to flow into the hole part 40 of the reflector 14 loaded with the flow tube 60. Even in the configuration illustrated in FIG. 6, the same effects as those of the configuration of FIG. 5 can be obtained.

Figure 12:
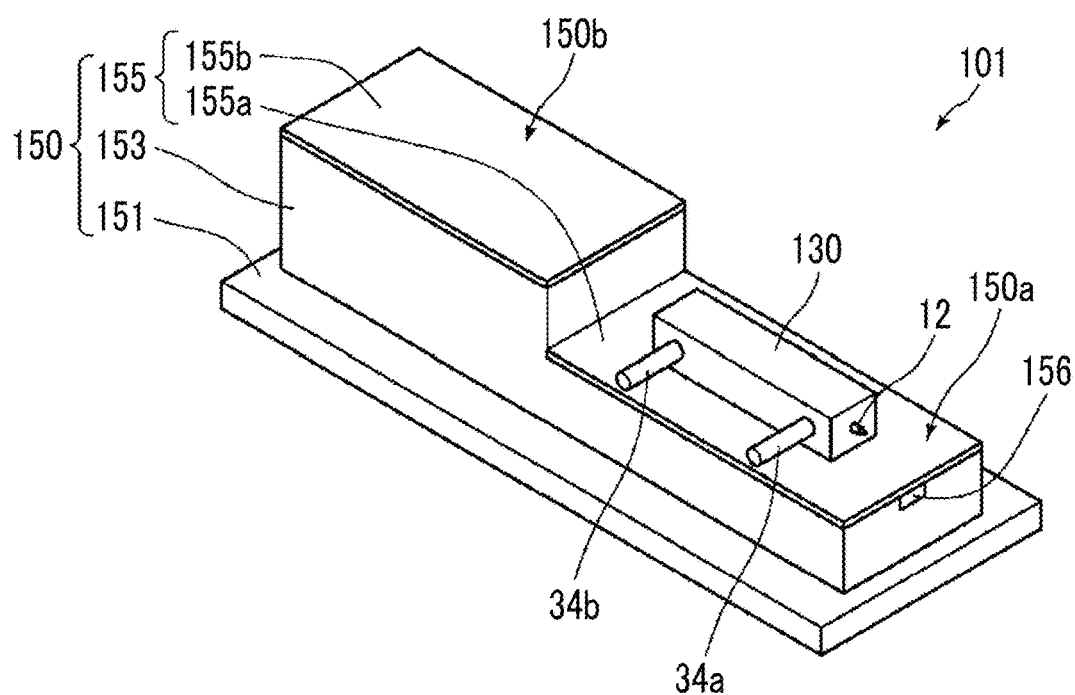
FIG. 12 is a schematic perspective view of a solid-state laser device related to a second embodiment.
Figure 13:
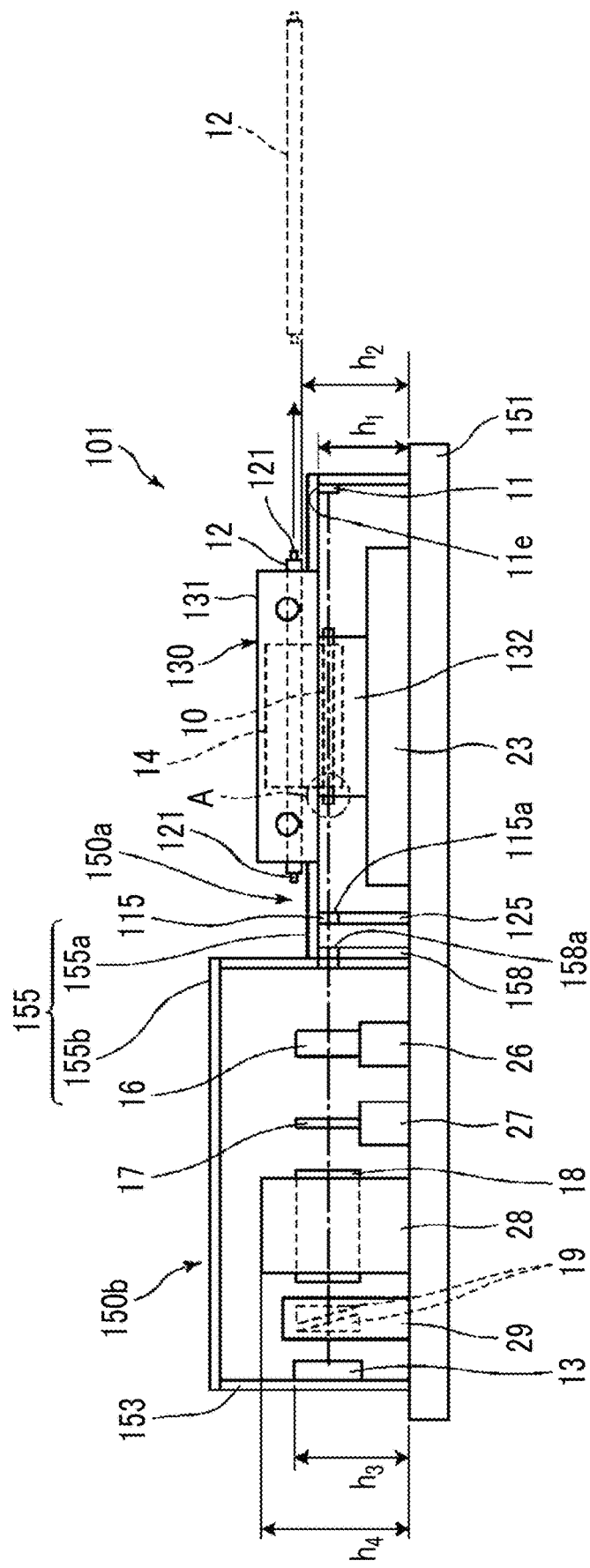
FIG. 13 is a side schematic view illustrating the schematic configuration in a side view of the solid-state laser device related to the second embodiment.
Figure 14:
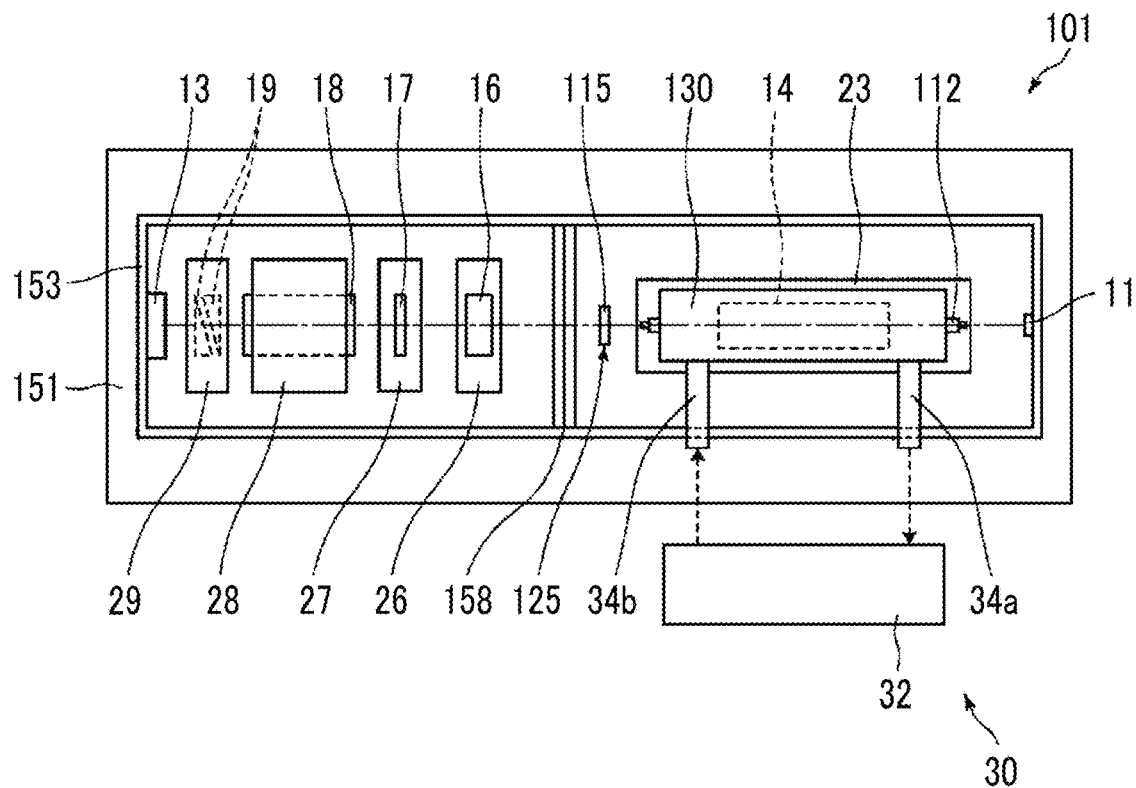
FIG. 14 is a plan schematic view illustrating the schematic configuration in a plan view of the solid-state laser device related to the second embodiment.

Next, a second embodiment of the invention will be described in detail. Hereinafter, a chamber 130, which contains the above-described reflector 14, and a housing 150 of a solid-state laser device will be described in detail. FIG. 12 is a perspective view schematically illustrating an external shape of the solid-state laser device related to the second embodiment of the invention. Additionally, FIGS. 13 and 14 are a schematic side view and a schematic plan view of the solid-state laser device related to the present embodiment, and both schematically illustrate the arrangement of internal constituent elements with a portion of the housing omitted. Hereinafter, only differences from those of the solid-state laser device 1 of the first embodiment will be described. The same constituent elements as those of the solid-state laser device 1 of the first embodiment will be designated by the same reference signs, and the detailed description thereof will be omitted.

A solid-state laser device 101 includes the pair of mirrors 11 and 13 that constitute the resonator, the laser rod 10 disposed in the resonator, and the laser chamber 130 that houses at least a portion of the laser rod 10. The solid-state laser device 101 includes an aperture member 115 in addition to the polarizer 16, the shutter 17, the Q-switch 18, and the wedge prism pair 19, as optical members, between the one mirror 12 and the laser rod 10. The mirrors 11 and 13, the laser rod 10, and the optical members 16 to 19 and 115 are disposed in the housing 150. Here, a portion of the laser chamber 130 is exposed to the outside from the housing 150, and the flash lamp 112 is housed in the portion of the laser chamber 130 exposed from the housing 150.

The housing 150 is constituted of a flat plate-shaped base 151, a side wall part 153, and a lid part 155, and a portion of side wall part 153 is provided with an emission opening 156 for outputting the laser light. In the present embodiment, the housing 150 has a first housing part 150a that houses a second portion 132 in which the output mirror 11 and the laser rod 10, that is, the laser rod 10 of the laser chamber 130, is housed, and a second housing part 150b that houses the rear mirror 13 and the optical members 16 to 19. In addition, although main optical members, such as the Q-switch and a shutter, are housed in the second housing part 150b, the aperture member 115 is housed in the first housing part 150a.

The first housing part 150a and the second housing part 150b are separated from each other by a partition plate 158 having an opening 158a on an optical path inside the housing 150. By including the partition plate 158 between the shutter 17 and the laser rod 10, adhesion of dust caused due to sliding of a shutter sliding part on the laser rod 10 and on the optical path in the vicinity of the laser rod 10 can be suppressed.

It is preferable that the opening 158a provided in the partition plate 158 has a diameter larger than the diameter of the laser rod 10 to such a degree that optical-axis adjustment is unnecessary.

In addition, as described above, although it is preferable that the partition plate 158 is provided inside the housing 150, the partition plate 158 may not be provided.

As illustrated in FIGS. 12 and 13, the height of the first housing part 150a and the height of the second housing part 150b are different from each other, the first housing part 150a includes a first lid 155a that opens the first housing part 150a, and the second housing part 150b includes a second lid 155b that opens the second housing part 150b. That is, the lid part 155 of the housing 150 includes the first lid 155a and the second lid 155b, and the first housing part 150a and the second housing part 150b are configured so as to be openable and closable independently. By virtue of the present configuration, during replacement of the optical members within the second housing part 150b and the optical-axis adjustment by the polarizer, this task can be performed by opening only the second housing part 150b with the first housing part 150a closed, and entering of dust into the first housing part 150a can be prevented.

In the present embodiment, the base 151 and the side wall part 153 of the housing 150 are basically made of strong metal, such as aluminum. The laser chamber 130 is installed in the first housing part 150a of the housing. Since the flash lamp 12 to be inserted through the laser chamber 130 has a structure in which positive and negative electrodes are provided in a glass tube in which gas is enclosed, it is necessary to apply a high voltage of several thousands of volts and several tens of thousands of volts to conductors around the electrodes in order to start discharge start between the electrodes. In the present configuration, discharge is started by applying the high voltage to the laser chamber 130. Thus, as the first lid 155a close to the laser chamber 130, a resin material having low conductivity is preferable from a viewpoint of electric safety. Meanwhile, during the driving of the flash lamp 12, there is heat generation of several hundreds of watts, and the first housing part 150a has a remarkable temperature rise. Thus, in the present configuration, it is preferable that the portions other than the first lid 155a of the first housing part 150a are made of a material of which the digit number (order) of the linear thermal expansion coefficient is the same as that of the side wall part 153 of the housing 150.

For example, in a case where the side wall part 153 of the housing 150 is aluminum, the linear thermal expansion coefficient of the aluminum is $23.5 \times 10^{-6}/°$ C. As the materials of the lids, resin materials, such as a modified polyphenylene oxide (PPO) having a linear thermal expansion coefficient of $22.0 \times 10^{-6}/°$ C., a modified PPE (polyphenylene ether) having a linear thermal expansion coefficient of $52.0 \times 10^{-6}/°$ C., and polycarbonate having a linear thermal expansion coefficient of $70.0 \times 10^{-6}/°$ C., are suitable.

In addition, in the present embodiment, the lids 155a and 155b are provided on an upper surface of the housing 150 that faces the base 151. A configuration in which the respective housing parts 150a and 150b are openable and closable with one surface of the side wall part 153 of the housing 150 as a lid may be adopted.

In the present embodiment, the output mirror 11 is a planar mirror, and the mirror 13 is a concave mirror. In the present embodiment, the output mirror 11 and the rear mirror 13 face each other and are attached to respective side surfaces in a lateral direction in the side wall part 153 that forms a portion of the housing 150. The output mirror 11 out of the output mirror 11 and the rear mirror 13 is attached to be capable of outputting the laser light from the emission opening 156 provided in a portion of the side wall part 153 of the housing 150.

The laser chamber 130 is of, for example, metal and is configured so as to house the laser rod 10 and the flash lamp 12 together with the reflector 14. The laser chamber 130 has a space for housing the laser rod 10 and the flash lamp 12 therein and transmits the light emitted from the flash lamp 12 therein to the laser rod 10. For example, the reflecting surface is formed inside the laser chamber 130. Thus, the light emitted from the flash lamp 12 is directly radiated to the laser rod 10 or is reflected by the reflecting surface and radiated to the laser rod 10.

Figure 15:
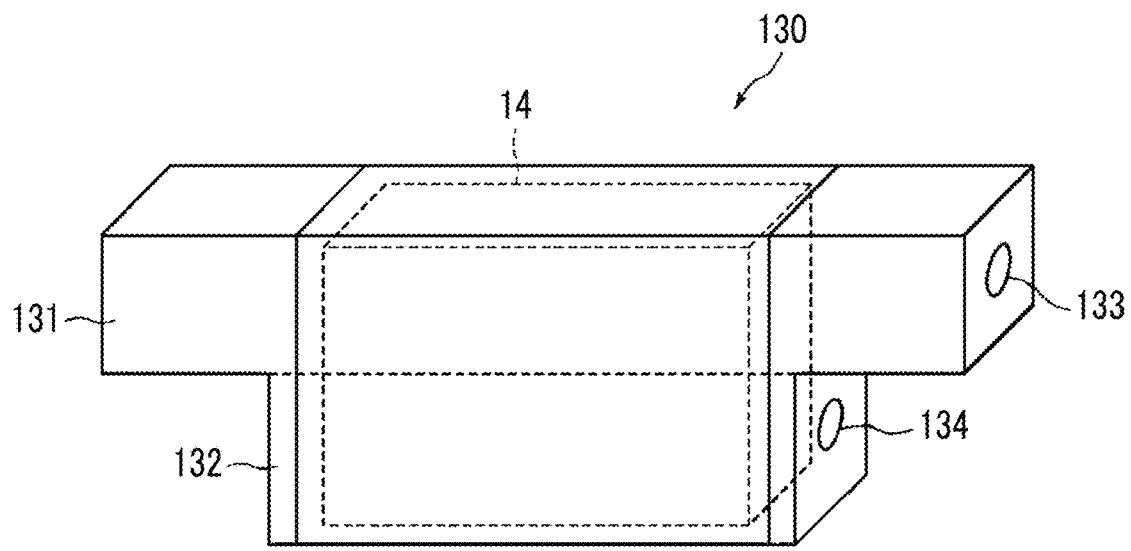
FIG. 15 is a perspective view of a laser chamber.

FIG. 15 is a perspective view illustrating an external appearance of the laser chamber 130. In FIG. 15, illustration of the holes for connecting the pipes 34a and 34b (refer to FIG. 12), and the like are omitted. The laser chamber 130 has a first portion 131 that houses the flash lamp 12, and a second portion 132 that houses the laser rod 10. The first portion 131 is provided with a hole part 133 that penetrates from a wall surface perpendicular to the longitudinal direction to the other wall surface and serves as a space for housing the flash lamp 12, and the second portion 132 is provided with a hole part 134 that penetrates from one wall surface perpendicular to the longitudinal direction to the other wall surface and serves as a space for housing the laser rod 10. That is, the two hole parts 133 and 134 are provided to be parallel to each other in the longitudinal direction of the laser chamber 130. The first portion 131 of the laser chamber 130 constitutes a holding part that holds the flash lamp 12 in the solid-state laser device of the present embodiment in parallel with the laser rod 10 on a side of the laser rod 10 opposite to the base 151.

The hole part 134 of the laser chamber 130 has a columnar shape shorter than the major-axis length of the laser rod 10, the laser rod 10 is supported in a state where the laser rod 10 is inserted through the hole part 134 and both end parts thereof are exposed from the hole part 134, and the flash lamp 12 is inserted through and supported by the hole part 133 (refer to FIG. 13). The shape of the hole part 134 is not limited to the columnar shape as long as the hole part 134 can receive the laser rod 10, and may be a prismatic shape, an elliptical columnar shape, or the like. The flash lamp 12 is capable of being taken out and inserted in the longitudinal direction, that is, to the right side in the drawing with respect to the laser chamber 130. In the present embodiment, the length of the first portion 131 of the laser chamber 130 in the longitudinal direction is longer than the length of the second portion 132 in the longitudinal direction. In addition, the lengths of the first portion 131 and the second portion 132 in the longitudinal direction may be the same as each other.

As illustrated in FIG. 13, the laser chamber 130 is supported by a supporting base 23 such that the first portion 131 that houses the flash lamp 12 protrudes to the outside from the lid part 155 of the housing 150 and the second portion 132 that houses the laser rod 10 is disposed within the housing 150, and replacement of the flash lamp 12 is allowed in a state where the lid part 155 is closed. The flash lamp 12 can be pulled out from the first portion 131 of the laser chamber to the output mirror 11 side.

The output mirror 11 is attached to a position where a height $h_1$ from the surface of the base 151 to the position of an upper end 11e of the output mirror 11 is lower than a height $h_2$ from the surface of the base 151 to the lower end of the flash lamp 12 housed in the first portion 131 of the laser chamber 130. Other optical members are not provided between the laser rod 10 and the output mirror 11. Hence, the flash lamp 12 can be easily pulled out from the hole part 134 to the output mirror 11 side in a longer direction thereof.

Figure 8:
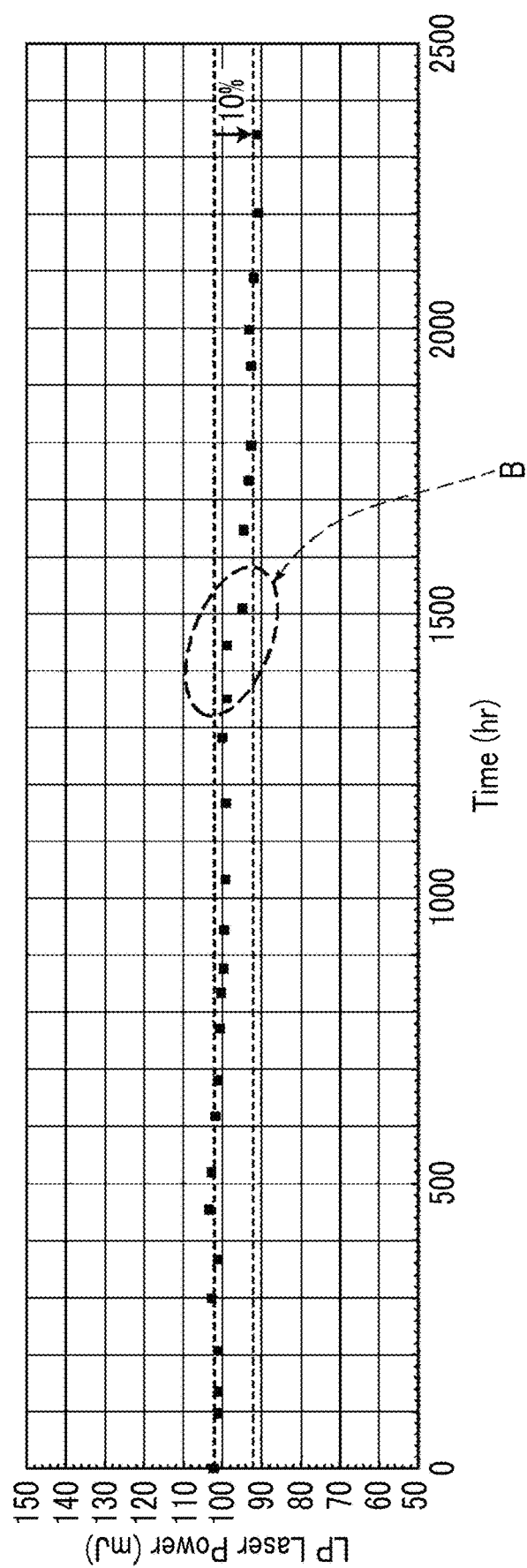
FIG. 8 is a graph illustrating time-dependent changes of the laser power of the comparative example.
Figure 16:
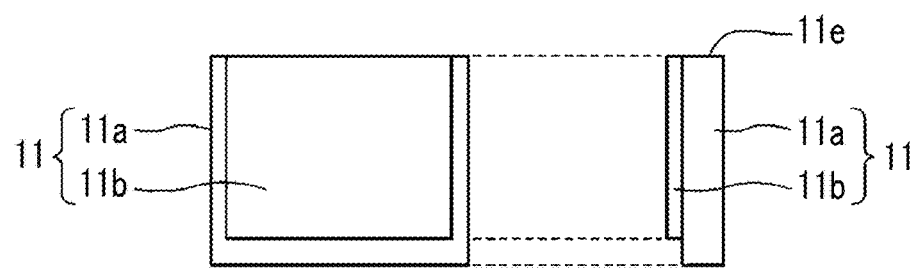
FIG. 16 is a front view and a side view of an output mirror.

A front view (left view) and a side view (right view) of the output mirror 11 are illustrated in FIG. 16. As illustrated in FIG. 16, the output mirror 11 is a planar mirror and includes a reflective coating 11b, as a resonator surface, on the surface of a flat plate-shaped base material 11a made of a multilayer film. Generally, although the planar mirror has a portion in which the reflective coating film is not formed at a peripheral edge of the surface of the base material, the output mirror 11 in the present embodiment includes the reflective coating 11b that is uniformly formed up to the upper end 11e except for a portion of a lower end and a portion of both ends. Here, as for the upper end and the lower end, with the base 151 as a reference, an end closer to the base 151 is defined as the lower end and an end separated from the base is defined as the upper end in a case where the planer mirror is installed in the solid-state laser device illustrated in FIG. 8. Such an output mirror 11 can be made, for example, by cutting one end part of a commercially available planar mirror in which the reflective coating film is not formed at the peripheral edge.

In the laser chamber 130, in order to efficiently irradiate the laser rod 10 with the excitation light from the flash lamp 12, it is preferable that the distance between the centers of the laser rod 10 and the flash lamp 12 is as close as possible. Since the output mirror 11 can be utilized as the reflecting surface up to the upper end 11e, pull-out of the flash lamp 12 to the output mirror 11 side is allowed, the flash lamp 12 can be located at a position that is as close to a resonator axis (laser optical axis) as possible within a range where a lower end position thereof does not overlap the optical path, and downsizing is also allowed. Particularly, the excitation efficiency can be made extremely high by setting the center-to-center distance between the flash lamp 12 and the laser rod 10 to 7 mm or less.

In the solid-state laser device 101, as already described, the aperture member 115, the polarizer 16, the shutter 17, the Q-switch 18, and the wedge prism pair 19 are provided as the optical members on the rear mirror 13 side of the laser rod 10.

The aperture member 115 has an opening 115a on the optical path, and blocks stray light that faces the laser rod side at a relatively large angle from the optical members 16 to 19 side and deviates greatly from the optical path.

Additionally, the wedge prism pair 19 is provided in order to perform optical system adjustment, such as correction of the optical axis, by the position and the angle thereof being adjusted. By including the wedge prism pair 19, it is possible to perform extremely precise optical-axis adjustment. Here, by disposing the aperture member 115 closest to the laser rod 10 side, the aperture member 115 can suppress the progress of the stray light generated in the polarizer 16, the shutter 17, the Q-switch 18, the wedge prism pair 19, the rear mirror 13, and the like to the laser rod 10 side.

The aperture member 115 is required to have less generation of dust or outgas, have smaller absorption of the laser light, and have heat resistance. Additionally, materials having diffusivity with respect to the laser light are desirable. Hence, as the material of the aperture member 115, ceramics, ground glass, or fluororesin, such as polytetrafluoroethylene (PTFE), is suitable.

Since the aperture member 115 prevents the stray light from striking the laser chamber 130, it is desirable to dispose the aperture member 115 between the laser chamber 130 and the other optical members 16 to 19 as in the present embodiment.

The optical members 115 and 16 to 19 are attached to holders 125 and 26 to 29, respectively, and the holders 125 and 26 to 29 are installed on the base 151 that forms a portion of the housing 150. In addition, the optical members 115 and 16 to 19 may be provided as necessary. In the solid-state laser device of the invention, a configuration only including, for example, only the Q-switch among the optical members may be adopted.

As illustrated in FIG. 13, all heights of the optical members 16 to 19 excluding the aperture member 115 from the base 151 among the optical members 115 and 16 to 19 disposed on the rear mirror 13 and the rear mirror 13 side of the laser rod 10 are higher than the height $h_2$ of the lower end of the flash lamp 12. Here, the heights of the rear mirror 13 and the optical members 115 and 16 to 19 are defined as positions farthest in a direction perpendicular from the surface of the base 151 parallel to the resonator optical axis, including the holders 125 and 26 to 29 that support these. For example, a height $h_3$ of the rear mirror 13 is a distance from the surface of the base 151 to an upper end of a rear mirror holder, and a height $h_4$ of the Q-switch 18 is a distance from the surface of the base 151 to an upper end of a holder 28 (refer to FIG. 2). The holders of the optical members, such as the rear mirror 13 and the Q-switch 18, to be disposed on the optical path have heights required to precisely support the optical members on the optical axis. Additionally, in a case where an attempt to utilize commercially available holders is made, it is difficult to make these heights low. In a case where optical members with these high heights are disposed on the output mirror 11 side of the laser rod 10, a case where the flash lamp 12 cannot be pulled out occurs. In the solid-state laser device 101, optical members having such heights that a track in a case where the flash lamp 12 is pulled out is blocked are not disposed on the output mirror 11 side, and all optical members higher than the height $h_2$ of the lower end of the flash lamp 12 are disposed on the rear mirror 13 side of the laser rod 10. Thus, easy pull-out of the flash lamp 12 to the output mirror 11 is allowed.

Additionally, as in the solid-state laser device 101, the output mirror 11 and the rear mirror 13 constitutes a linear resonator, and all the optical members other than the output mirror 11 are configured to be disposed on the laser rod 10 and the rear mirror 13 side. Accordingly, a resonator portion of the solid-state laser device can be made extremely small, and it is possible to realize downsizing also as the entire device.

In a case where a plurality of optical members are disposed between the output mirror 11 and the rear mirror 13, especially, it is preferable that, especially, a distance from an optical member (the aperture member 115 in the present example) disposed closest to the laser rod 10 side among the optical members to the rear mirror 13 is shorter than the length of the flash lamp 12. Accordingly, the housing part 150*b* can be made still smaller, and further downsizing of the housing is allowed.

As a specific configuration of this solid-state laser device 101, for example, in a case where the laser rod 10 has a diameter of 4 mm or less and a length of 75 mm or less, a resonator portion having a resonator length of 280 mm or less, a resonator width of 70 mm or less, and a height of 60 mm or less can be configured. In this case, the volume of the resonator portion is 1, 176,000 mm$^3$ (=1176 cm$^3$). Here, the resonator length is a distance between the reflecting surfaces of the output mirror 11 and the rear mirror 13, and the width and the height of the resonator are defined by the largest portion of the holders of the optical members disposed within the resonator.

As an outer shape of the housing that contains the resonator, the length is 350 mm or less, the width is 160 mm or less, and height is 70 mm or less. In this case, the area of the base of the solid-state laser device can be 56,000 mm$^2$ (560 cm$^2$) or less.

In the alexandrite laser having the above configuration, in a case where the laser is driven with an input power of 22 J, a pulse laser having a pulse width of 40 nsec (n seconds) can be oscillated. In addition, it is possible to oscillate a pulse laser having a pulse width of 30 nsec less with an input power of 18 J.

Particularly, a pulse width of 40 nsec or less can be realized by using a laser rod having a diameter of 3 mm or less, and a pulse width of 30 nsec or less can be realized by setting the diameter to 2.5 mm or less.

Here, a configuration for stably allowing the output of the laser light for a long period of time in the solid-state laser device 101 of the present embodiment will be described.

Figure 17:
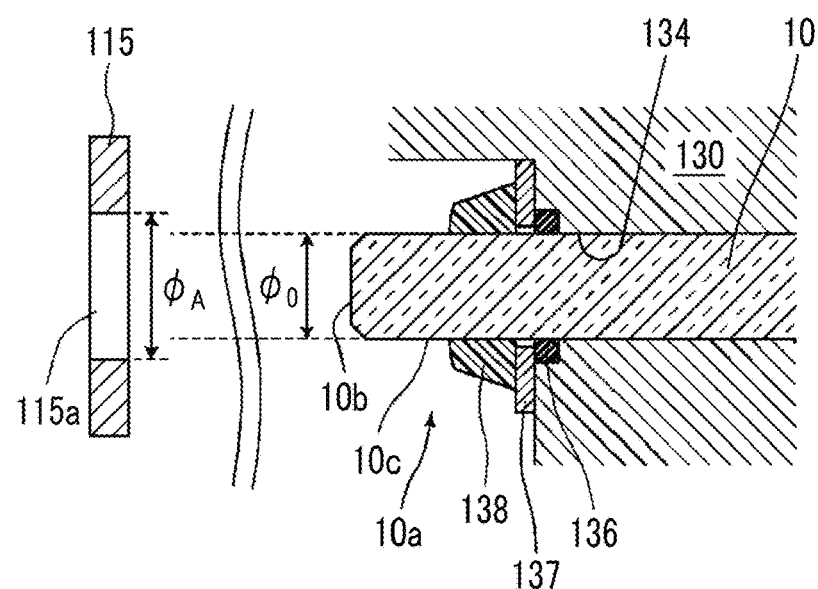
FIG. 17 is an enlarged cross-sectional view illustrating the vicinity of a laser rod end part exposed from the laser chamber.

An enlarged cross-sectional view in the vicinity of one end part (a region A surrounded by a dashed line in FIG. 13) of the laser rod 10 exposed from the laser chamber 130 is illustrated in FIG. 17. In addition, a cross-section of the aperture member 115 is altogether illustrated in FIG. 17.

As illustrated in FIG. 17, an O-ring 136 is disposed at an exposed root of an end part 10*a* (hereinafter, referred to as a "rod end part 10*a*") of the laser rod 10 from the hole part 134 of the laser chamber 130, and an O-ring retaining plate 137 having a through-hole that allows the laser rod 10 to pass therethrough is disposed adjacent to the O-ring 136 on an end face 10*b* (hereinafter, referred to as a "rod end face 10*b*") side of the laser rod 10. The inside of the laser chamber 130 serves as a flow channel for the cooling medium, and insertion parts of the laser rod 10 and the flash lamp 12 are appropriately sealed with O-rings or the like for sealing. In addition, the exposed root of the rod end part 10*a* from the laser chamber 130 means a portion closest to the laser chamber 130 (that is, the hole part 134 side) in the rod end part 10*a* exposed from the hole part 134 of the laser chamber 130. In addition, hereinafter, there is a case where the exposed root from the hole part 134 of the laser chamber 130 is referred to as an exposed root from a laser chamber. The O-ring 136 is fitted into the laser rod 10 and is disposed in an O-ring receiving part provided at an end part of the hole part 134 of the laser chamber 130. By screwing the O-ring retaining plate 137 to the laser chamber 130, the O-ring 136 is biased to the laser chamber 130 side, and the laser rod 10 is fixed. A cover member 138, which hinders the incidence of the stray light generated within the housing 150 to the O-ring 136, is provided on a side surface 10*c* (hereinafter, referred to as a "rod side surface 10*c*") of the laser rod closer to the rod end face 10*b* than the O-ring 136 fitted into the rod end part 10*a*.

Although it is preferable that the O-ring 136, the O-ring retaining plate 137, and the cover member 138 are provided at each of both end parts exposed from the laser chamber 130, the O-ring 136, the O-ring retaining plate 137, and the cover member 138 may be provided at least at one end part. Additionally, the O-ring retaining plate 137 may not be provided in a case where the cover member 138 has the same function as that of the O-ring retaining plate 137.

In the solid-state laser device, the laser rod that is a solid-state laser medium is the optical path itself, and it can be said that a member touching the laser rod is substantially in contact with the optical path. As illustrated in FIG. 17, the O-ring 136 is present very near the rod end face 10*b*, and dust or gas is likely to adhere to the rod end face 10*b* in a case where the dust or the gas is generated in the O-ring 136. Then, in a case where the dust or the gas adhering to the rod end face 10*b* is irradiated with the laser light, there is a case where seizure is caused and the laser rod 10 is damaged. In the solid-state laser device 101 of the present embodiment, the incidence of the stray light to the O-ring 136 can be prevented by including the above cover member 138. Thus, generation of dust or outgas can be effectively suppressed.

The cover member 138 is required to have less generation of dust or outgas, have smaller absorption of the laser light, and have heat resistance. Additionally, it is desirable to have diffusivity with respect to the laser light. Hence, it is preferable that the cover member 138 is made of at least one of ceramics, ground glass, or fluororesin, such as PTFE. In order to prevent the stray light from entering the O-ring 136, it is desirable that the cover member 138 is made of a flexible material having high adhesion to the laser rod 10. Hence, particularly, fibrous ceramics or glass, non-baked fluororesin, or the like is suitable.

As illustrated in FIG. 17, in the solid-state laser device 101, the opening diameter of the aperture member 115 is preferably the rod diameter $\varphi_0$ or more, and more preferably larger than the rod diameter $\varphi_0$. Particularly, in a case where a fine-diameter laser rod having a rod diameter $\varphi_0$ of 4 mm or less is adopted as the laser rod 10 for downsizing the device and making the pulses of the laser light short, the opening limitation by the aperture member 115 greatly affects the laser output. That is, with respect to the fine-diameter laser rod, the arrangement precision of the aperture member 115 has high sensitivity for the laser output. Thus, in a case where the arrangement precision of the aperture member 115 is low, a decrease in stability occurs, while enhancing the arrangement precision leads to an increase in manufacturing cost. Hence, in a case where the fine-diameter laser rod is adopted, it is more desirable that the opening diameter of the aperture member is larger than the rod diameter. However, in a case where the opening diameter of the aperture member is too large, there is a case where the blocking effect of the stray light is not sufficiently obtained. Therefore, it is preferable to set the opening diameter to 120% or less of the rod diameter. In addition, it is preferable that the opening shape of the aperture member 115 is similar to the end face shape of the laser rod 10.

In the present embodiment, although the aperture member 115 is disposed only on the rear mirror 13 side of the laser rod 10, it is preferable that the aperture member 115 is disposed on each of both end face sides of the laser rod 10 from a viewpoint of protection by the blocking of the stray light. However, in a case where the aperture member 115 is disposed on each of both end face sides of the laser rod 10, request for the arrangement precision increases, which leads on an increase in manufacturing increase. Particularly, this request is remarkable in a case where the rod has a fine diameter. In the present embodiment, since the various optical members 16 to 19 are intensively disposed on the rear mirror 13 side of the laser rod 10 to bring the generation point of main stray light to one side, a highly sufficient protection effect is obtained even in a case where the aperture member 115 is disposed only on one side.

Figure 18:
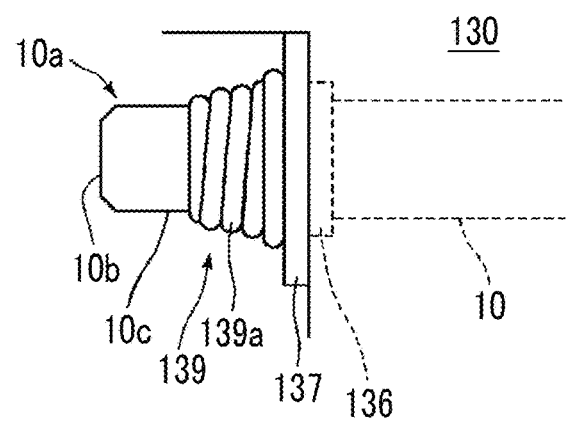
FIG. 18 is an enlarged view illustrating the vicinity of a laser rod end part including a cover member of a design change example.

FIG. 18 is an enlarged view illustrating the vicinity of a laser rod end part including a cover member 139 of a design change example. The cover member 139 illustrated in FIG. 18 is formed by winding a tape 139a made of PTFE around the rod side surface 10c multiple times. The cover member 139 configured by winding the tape 139a multiple times has high adhesion with the laser rod 10 and the size thereof can be freely changed depending the number of times of winding, which is preferable. By winding the tape 139a to such a degree that the O-ring 136 cannot be visually recognized in a case where a visual recognition is made from the rod end face 10b side, the incidence of the stray light to the O-ring 136 can be effectively suppressed.

Additionally, in FIG. 18, in a case where the O-ring 136 is sufficiently biased by the cover member 139 to allows the laser rod 10 to be fixed, the O-ring retaining plate may not be provided.

In addition, a general O-ring made of rubber that is not based on fluororesin can be used as the O-ring 136. Meanwhile, it is more preferable to make the O-ring 136 itself of a material with less generation of dust or outgas, for example, fluororesin-based rubber.

Additionally, as illustrated in FIGS. 17 and 18, in a case where the O-ring retaining plate 137 is provided, there is a case that the stray light is incident on the O-ring retaining plate 137 and dust or outgas is generated. Therefore, as the O-ring retaining plate 137, it is also preferable to use an O-ring retaining plate using a material with less generation of dust or outgas, for example, ceramics, fluororesin, or the like. Alternatively, it is also preferable to adopt a configuration in which the cover member is enlarged to suppress the incidence of the stray light to the O-ring retaining plate.

As described above, in a case where the cover members 138 and 139 that suppress the stray light to the O-ring 136 at the exposed root of the laser rod 10 from the laser chamber 130 are provided, damage to the laser rod 10 can be suppressed, and stable laser output for a long period of time can be obtained. Additionally, in a case where the aperture member 115 is provided, the incidence of the stray light to the laser chamber 130 can also be suppressed, and it is possible to more effectively suppress damage to the laser rod 10.

It is particularly preferable that the aperture member 115 and the cover member 138 or 139 are simultaneously provided on the same end face side of the laser rod 10. However, the solid-state laser device of the invention is not limited to a configuration in which the aperture member and the cover member are provided on the same end face side, and it is preferable that at least the cover member is provided on either a rear side or an output side. In the present embodiment, since the various optical members 16 to 19 are intensively disposed on the rear mirror 13 side of the laser rod 10 to bring the generation point of main stray light to one side, combination patterns of the arrangement of the aperture member and the cover member include patterns as shown in the following Table 1 as minimum configurations. In Table 1, the rear side and the output side respectively mean the rear mirror 13 side and the output mirror 11 side of the laser rod 10. In Table 1, "Yes" means that the aperture member or the cover member is provided and "-" means that the aperture member or the cover member is not provided. With respect to the minimum configurations illustrated in Table 1, combinations obtained by changing "-" into "Yes" are also preferable.

TABLE 1

| No. | Rear Side | | Output Side | |
| --- | --- | --- | --- | --- |
| | Aperture | Cover Member | Aperture | Cover Member |
| 1 | Yes | Yes | — | — |
| 2 | Yes | — | — | Yes |

A configuration in which the aperture member and the cover member are provided on both end faces of the laser rod is the most preferable from a viewpoint of suppressing the incidence of the stray light to the laser rod and the laser chamber. Meanwhile, as already described, in the case where the aperture member is provided on each of both the end faces, substantial time and effort are taken for alignment, which leads to an increase in manufacturing cost. The configuration described as the above-described embodiment is equivalent to Pattern No. 1 in Table 1. It is preferable that the aperture member and the cover member are simultaneously provided on a side where the optical members, such as the Q-switch and the shutter are disposed (the rear side in the present embodiment) as in the present embodiment because the incidence of the stray light can be most efficiently suppressed and manufacturing costs can also be suppressed.

Figure 19:
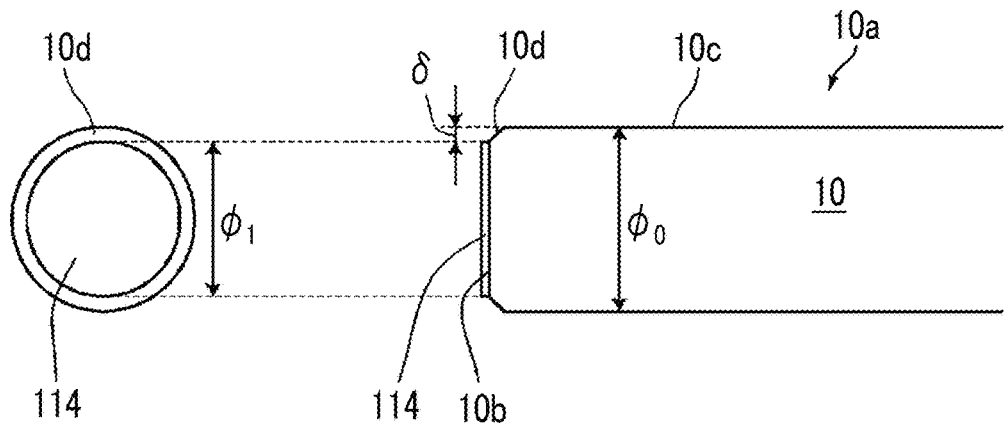
FIG. 19 is an end front view and an end part side view of the laser rod.

Now, the configuration of an end face of the laser rod 10 will be described in more detail. FIG. 19 illustrates a side view (right view) and an end front view (left view) of the end part 10a of the laser rod 10. As illustrated in FIG. 19, the laser rod 10 includes a chamfered part 10d between the rod end face 10b and the rod side surface 10c. That is, the laser rod 10 has the chamfered part 10d at a peripheral edge of the end face 10b, specifically, on a radial outer side of an outer periphery of the end face 10b. The chamfered part 10d is a rough surface. The rod end face 10b is provided with an antireflection film 114. In FIG. 19, although only one end face of the laser rod is illustrated, both end faces have the same configuration. It is preferable that the antireflection film 114 is provided on the entire face of the rod end face 10b.

A width δ of the chamfered part 10d equivalent to a difference between the radius of the laser rod 10 and the radius of outer periphery of the end face is about 1 to 5%, preferably about 2% of the rod diameter $\varphi_0$. For example, in a case where the rod diameter $\varphi_0$ is 2.5 mm, the width δ of the chamfered part 13d is set to 0.05 mm or the like.

Here, a separate additional configuration for stably allowing the output of the laser light for a long period of time in the solid-state laser device 101 of the present embodiment will be described. An enlarged cross-sectional view in the vicinity of one end part (the region A surrounded by a dashed line in FIG. 13) of the laser rod 10 exposed from the laser chamber 130 in a case where the separate additional configuration is provided is illustrated in FIG. 20.

A configuration in which the O-ring 136, and the O-ring retaining plate 137 having a through-hole for allowing the laser rod 10 to pass therethrough, on the rod end face 10b side adjacent to the O-ring 136 are disposed at the exposed root of the laser rod 10 from the laser chamber 130 is the same as that of FIG. 12.

Figure 20:
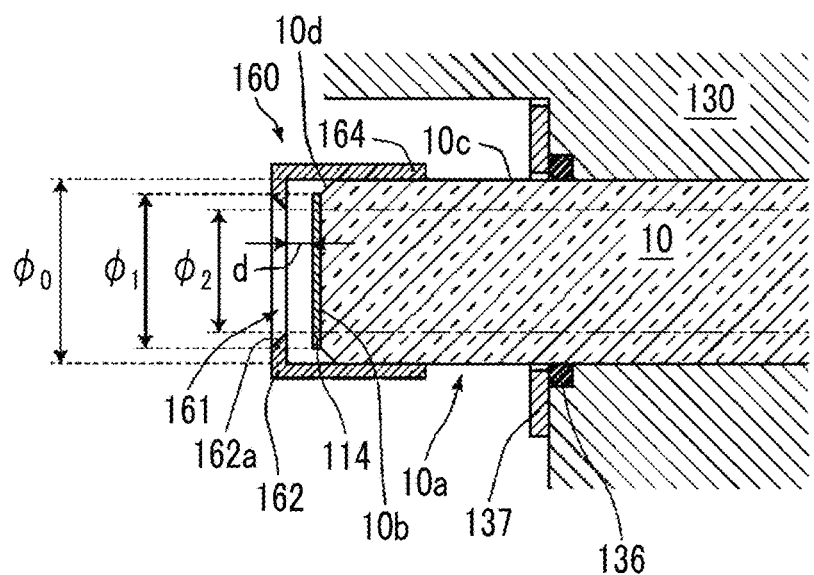
FIG. 20 is an enlarged cross-sectional view illustrating the vicinity of the laser rod end part exposed from the laser chamber.

In the example illustrated in FIG. 20, an end face protecting member 160 having an opening defining part 162 that constitutes an opening 161 having a diameter $\varphi_2$ smaller than a diameter $\varphi_1$ of the outer periphery of the rod end face 10b is provided at a position facing the rod end face 10b. The end face protecting member 160 limits a laser light path region in the rod end face 10b to a region inside the outer periphery of the rod end face 10b. In a case where the end face protecting member 160 is not provided, the entire region of the laser rod 10 is the optical path, and an optical-path cross-section is equal to a circular cross-section having the diameter $\varphi_0$. However, the optical path is limited to a circular cross-section region having the diameter $\varphi_2$ illustrated by a two-point chain line in FIG. 20 by including the end face protecting member 160.

In this way, by including the end face protecting member 160, the laser light path region is limited to the region inside the outer periphery of the rod end face 10b, that is, the laser light path is limited to a region inside an inner periphery of the chamfered part 10d. Hence, during laser oscillation, the laser light is not radiated to a boundary between the rod end face 10b and the chamfered part 10d. As already described, it cannot be said that the boundary between the rod end face 10b and the chamfered part 10d have excellent coating of an optical film, and is a region that is likely to be a starting point of coating breaking. However, occurrence of the coating breaking can be suppressed as long as high-energy laser light is not radiated. That is, the occurrence of the coating breaking in the rod end face 10b can be suppressed by including the end face protecting member 160.

Figure 21:
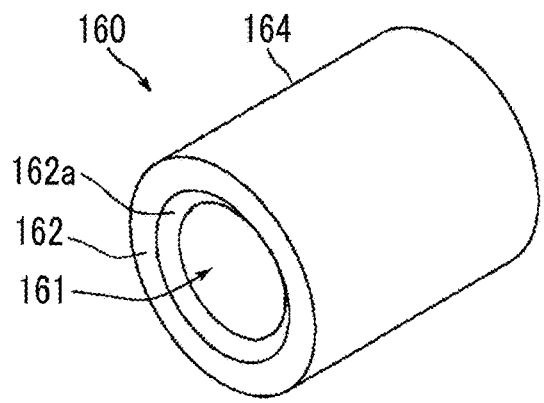
FIG. 21 is a perspective view of an end face protecting member.
Figure 22:
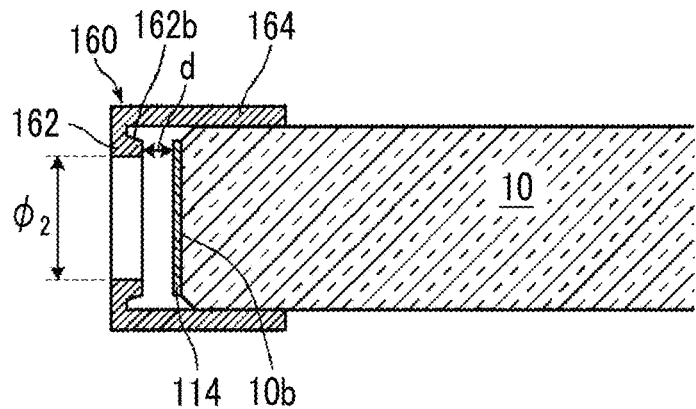
FIG. 22 is a view for explaining a distance d between an opening defining part and the rod end face.

As illustrated in a perspective view of the end face protecting member 160 in FIG. 21, the end face protecting member 160 in the present embodiment has a tubular part 164 that supports the opening defining part 162, and has a cap shape in which the tubular part 164 is fitted and mounted to the rod end part 10a. The shape of the end face protecting member 160 is not particularly limited as long as the opening defining part 162 can be stably supported and disposed in the vicinity of the rod end face 10b. However, it is preferable as long as the end face protecting member 160 has the cap shape capable of being fitted and mounted as in the present embodiment because the arrangement precision can be easily guaranteed.

It is essential that the opening defining part 162 is provided very close to the rod end face 10b so as to cover the boundary between the rod end face 10b and the chamfered part 10d. The term "very close" means such a distance that a distance d (refer to FIG. 15) between the rod end face 10b and the opening defining part 162 has no significant difference in the effect on a state (that is, d=0) where both come into contact with each other. Specifically, the distance d is preferably 0.5 mm or less and more preferably 0.1 mm or less, and it is particularly preferable that the rod end face 10b and the opening defining part 162 come into contact with each other. In addition, since the antireflection film 114 is provided on the surface of the rod end face 10b, in the present specification, the distance of the opening defining part 162 from the rod end face 10b means a distance between the opening defining part 162, and the surface of the antireflection film 114 provided on the rod end face 10b. Similarly, the contact between the rod end face 10b and the opening defining part 162 means that the surface of the antireflection film 14 provided on the rod end face 10b, and the opening defining part 162 come into contact with each other.

Additionally, as illustrated in FIG. 20, it is preferable the opening defining part 162 of the end face protecting member 160 include a tapered part 162a of which the opening diameter becomes smaller as being closer to the rod end face 10b. By including the tapered part 162a, vignetting of the optical path by the opening defining part 162 can be suppressed.

In addition, the distance between the opening defining part 162 and the rod end face 10b is defined as a distance between a portion located closest to the rod end face 10b side in the portion constituting the diameter $\varphi_2$ of the opening defining part 162, and the rod end face 10b. For example, in the case of a shape which a portion 162b constituting the diameter $\varphi_2$ of the opening defining part 162 protrudes to the rod end face 10b side as shown in FIG. 17, a distance from the face of the protruding portion 162b on the rod end face 10b side to the rod end face 10b is the distance d between the opening defining part 162 and the rod end face 10b.

Although the end face protecting member 160 is provided on each of both the end faces of the laser rod 10, the end face protecting member 160 may be provided on any one end face. Even only one end face protecting member exhibits the effect of limiting a laser oscillation region. In a case where the fine-diameter laser rod is adopted in accordance with requests for downsizing the device, making the pulses short, and the like, the opening limitation greatly influences the laser output. That is, in a case where each of both end parts of the fine-diameter laser rod is provided with the end face protecting member, the manufacture precision and the arrangement precision of the end face protecting member have high sensitivity for the laser output. As a result, there is a case where this leads to a decrease in stability or an increase in manufacturing cost. Hence, it is desirable that the protecting member is provided only on one end face.

Since the opening defining part 162 of the end face protecting member 160 is in contact with the laser light path, as materials, it is required that there is no damage or deformation resulting from the laser light and there is less generation of dust or outgas. Hence, as materials of the opening defining part 162, ceramics or fluororesin is suitable. It is preferable that the entire end face protecting member 160 including the opening defining part 162 is made of at least one of ceramics or fluororesin.

Figure 23:
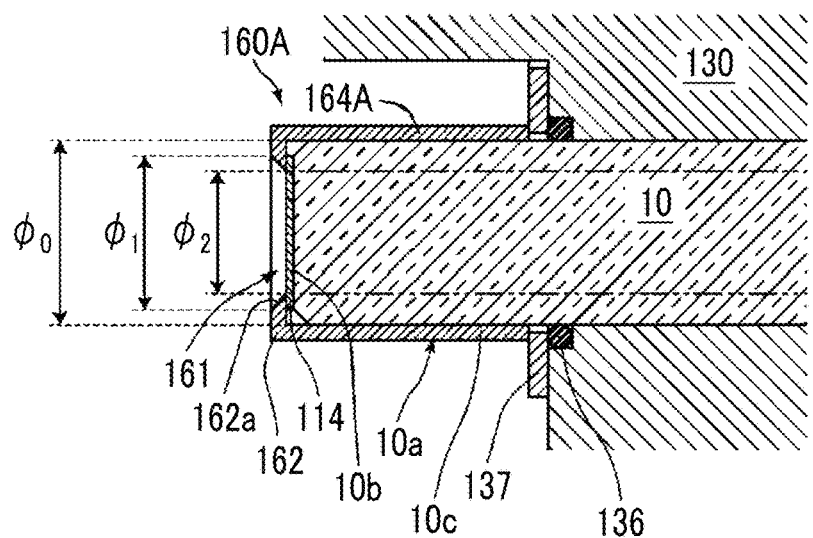
FIG. 23 is an enlarged cross-sectional view illustrating the vicinity of a laser rod end part including an end face protecting member of a design change example.

FIG. 23 is a cross-sectional view illustrating a design change example of the end face protecting member.

An end face protecting member 160A illustrated in FIG. 23 has such a length the opening defining part 162 comes into contact with the rod end face 10b (here, the antireflection film 114 formed on the rod end face 10b) and a tubular part 164A collides against the O-ring retaining plate 137 provided at the exposed root of the laser rod 10 from the laser chamber 130. In this way, by forming the end face protecting member 160A in the shape of a cover that covers the entire exposed part of the rod side surface 10c of the end part 10a of the laser rod 10 exposed from the laser chamber 130, the arrangement precision of the opening defining part 162 with respect to the rod end face 10b can be enhanced, which is preferable. Additionally, by including the end face protecting member 160A having a shape that covers up to the exposed root of the laser rod 10, it is possible to suppress the incidence of the stray light generated within the housing 150 onto the O-ring 136 provided at the exposed root of the laser rod 10 from the laser chamber 130. In a case where the stray light is incident, there is a case where dust or outgas is generated from the O-ring 136, and the dust or outgas adheres to the rod end face, causes seizure, and damages the rod end face. However, since the incidence of the stray light onto the O-ring 136 can be suppressed by the end face protecting member 160A, the damage to the laser rod 10 can be more effectively prevented.

Figure 24:
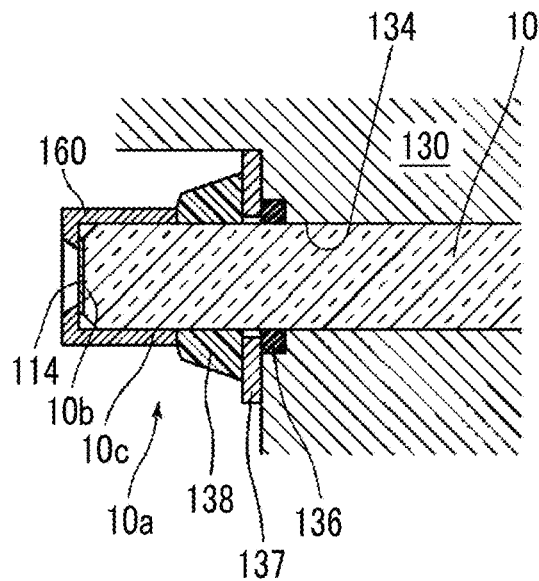
FIG. 24 is an enlarged cross-sectional view illustrating the vicinity of a laser rod end part of a solid-state laser device related to a third embodiment.

The above cover member 138 and the above end face protecting member 160 can also be used in combination. FIG. 24 illustrates an enlarged cross-sectional view of an exposed part of the laser rod 10 from the laser chamber 130 in a case where the cover member 138 and the end face protecting member 160 are provided in combination.

By including the above cover member 138 and the above end face protecting member 160, the entire region of the side surface 10c of the rod end part 10a is covered similarly to a case where the end face protecting member 160A illustrated in FIG. 23 is provided. Therefore, the incidence of the stray light onto the O-ring 136 can be prevented by the cover member 138 in addition to the prevention of the damage to the antireflection film 114 by the end face protecting member 160. Thus, the generation of dust or gas can be effectively suppressed, the damage to the laser rod 10 can be effectively suppressed, and it is possible to realize further stability for a long period of time.

Figure 25:
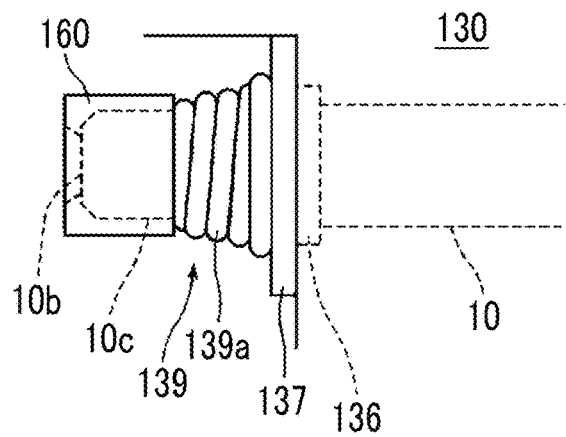
FIG. 25 is a side view illustrating the vicinity of a laser rod end part including a cover member of a design change example.

Additionally, as illustrated in FIG. 25, even in a case where the cover member 139 illustrated in FIG. 18 and the end face protecting member 160 are provided in combination, the same effects can be obtained.

In addition, it is particularly preferable that the aperture member 115, the cover member 138 or 139, and the end face protecting member 160 or 160A are simultaneously provided on the same end face side of the laser rod 10. However, all the members are not necessarily provided simultaneously, and the solid-state laser device of the invention has a configuration in which any of these members is additionally provided. In addition, as preferable arrangement patterns of minimum configurations, arrangement patterns illustrated in the following Table 2 are mentioned. In Table 2, the rear side and the output side respectively mean the rear mirror 13 side and the output mirror 11 side of the laser rod 10. In Table 2, "Yes" means that the aperture member, the cover member, or the end face protecting member is provided and "-" means that the aperture member, the cover member, or the end face protecting member is not provided. With respect to the minimum configurations illustrated in Table 2, combinations obtained by changing "-" into "Yes" are also preferable.

TABLE 2

| | Rear Side | | | Output Side | | |
|---|---|---|---|---|---|---|
| No. | Aperture | Cover Member | End Face Protecting Member | Aperture | Cover Member | End Face Protecting Member |
| 1 | Yes | Yes | — | — | — | Yes |
| 2 | Yes | — | Yes | — | Yes | — |
| 3 | Yes | — | Yes | — | — | Yes |
| 4 | Yes | — | Yes | — | — | — |
| 5 | Yes | — | — | — | — | Yes |

As in the above configuration, it is preferable that the aperture member is provided on the rear side where many optical members are disposed. Additionally, here, as the end face protecting member, the fitting type having the cap shape in which the optical axis alignment is unnecessary is assumed. Therefore, the end face protecting member is preferably provided on at least one end face, and more preferably provided on each of both ends.

Figure 26:
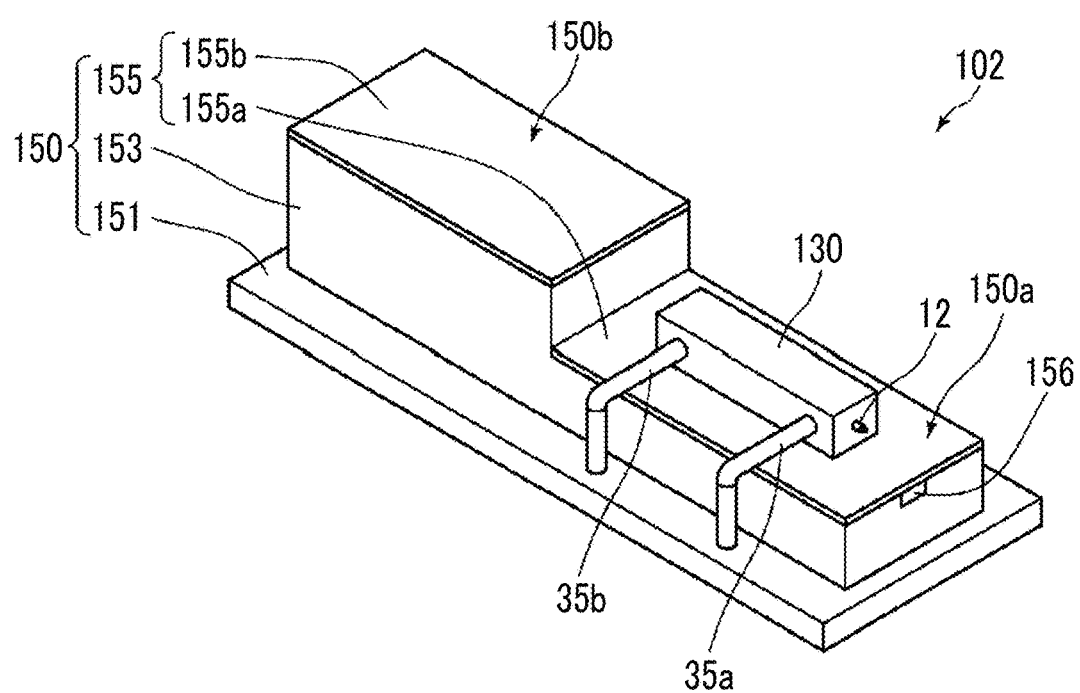
FIG. 26 is a schematic perspective view of the solid-state laser device related to the third embodiment.
Figure 27:
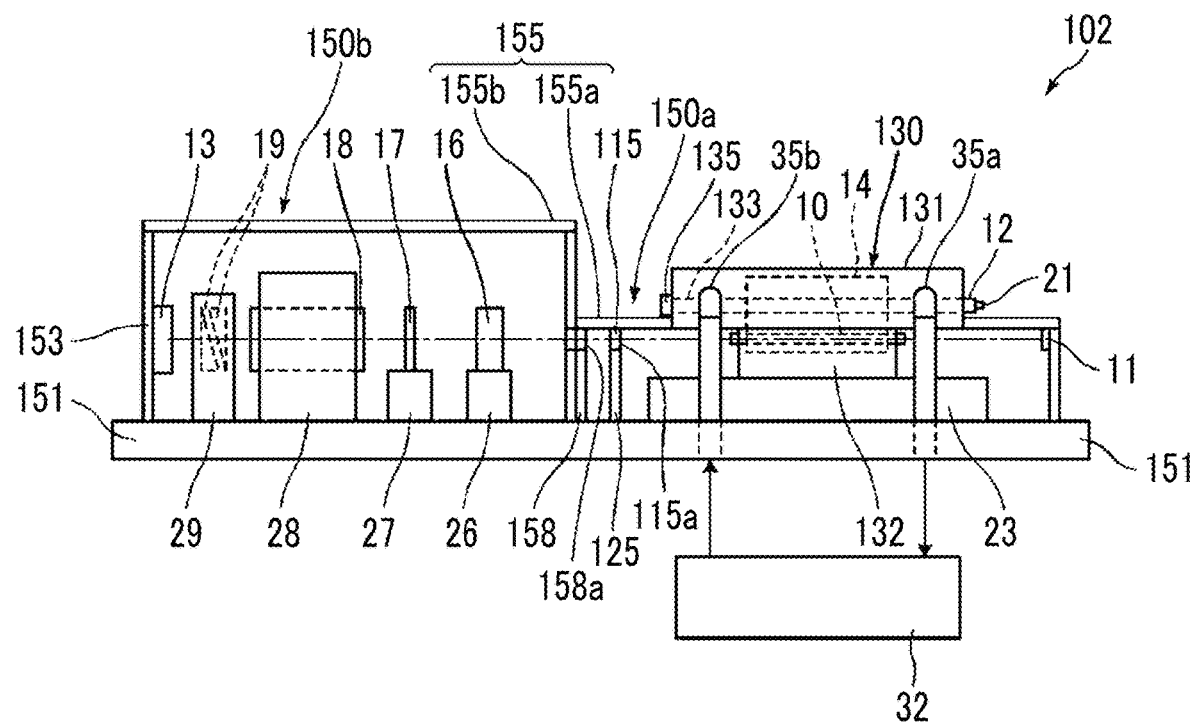
FIG. 27 is a side schematic view illustrating the schematic configuration in a side view of the solid-state laser device related to the third embodiment.
Figure 28:
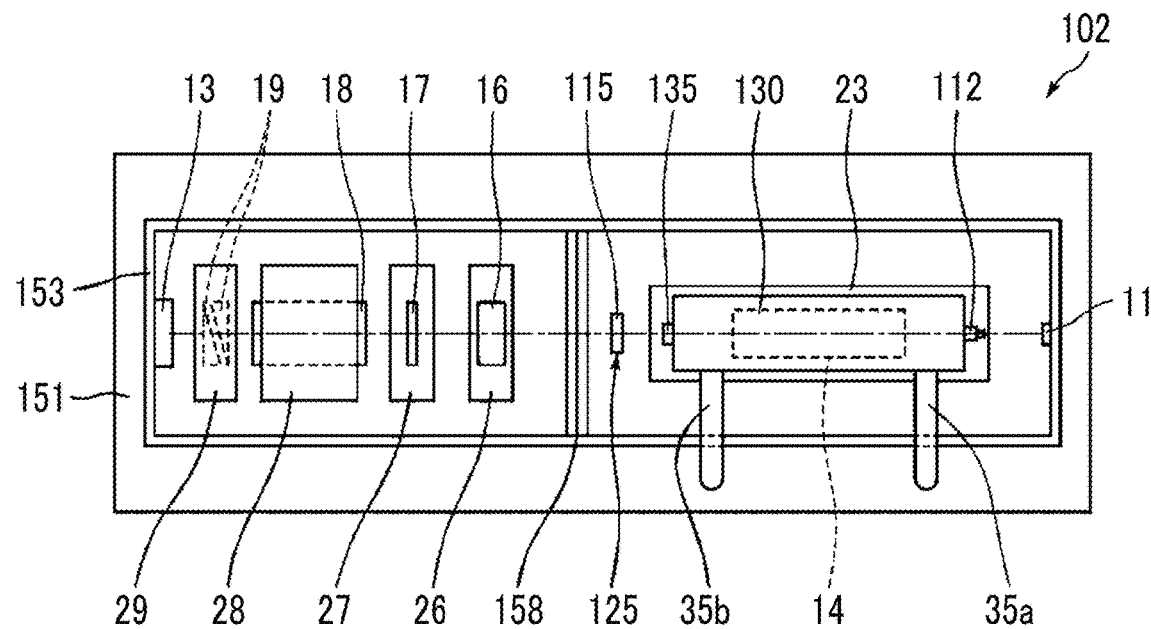
FIG. 28 is a plan schematic view illustrating the schematic configuration in a plan view of the solid-state laser device related to the third embodiment.

Next, a solid-state laser device 102 of a third embodiment will be described. FIG. 26 is a perspective view schematically illustrating an external shape of the solid-state laser device related to the third embodiment of the invention. Additionally, FIGS. 27 and 28 are a schematic side view and a schematic plan view of the solid-state laser device related to the present embodiment, and both schematically illustrate the arrangement of internal constituent elements with a portion of the housing omitted.

Here, only differences from those of the solid-state laser device 101 of the second embodiment will be described. The same constituent elements as those of the solid-state laser device 1 of the first embodiment and those of the solid-state laser device 101 of the second embodiment will be designated by the same reference signs, and the detailed description thereof will be omitted.

In the solid-state laser device 102 of the present embodiment, one end (here, one end on the rear mirror 13 side) of the hole part 133 that houses the flash lamp 12 of the laser chamber 130 is provided with a sealing terminal 135 having a socket or a plug having electrodes. That is, one end of the hole part 133 has a butting structure in which terminals of the electrodes are buried therein. The flash lamp 12 is inserted into the hole part 133 from the right side in FIG. 27, butts against the sealing terminal 135, and is connected to a power source terminal.

As in the present configuration, by making the hole part 133 for housing the flash lamp 12 have the butting structure, positioning of the flash lamp 12 during replacement becomes easy, and a decrease in the excitation efficiency resulting from the positional deviation of the flash lamp 12 during replacement, or the like, can be prevented.

Additionally, in the solid-state laser device 101 of the second embodiment, the pipes 34a and 34b for a cooling medium connected to the laser chamber 130 are configured to extend in a horizontal direction. In contrast, in the solid-state laser device 2 of the present embodiment, the pipes 35a and 35b are bent in an L-shape and are disposed to extend in a direction perpendicular to a base toward the base 151 along a wall surface of the side wall part 153 of the housing 150. The hole is provided outside the side wall part 153 of the base 151, and the pipes 35a and 35b are connected to a cooling control unit 32 disposed under the base 151 from this hole. In addition, as for the pipes 35a and 35b, it is preferable that portions connected to the laser chamber 130 are connected by members having rigidity, such as metal, and portions from the rigid members to the cooling control unit 32 are made of flexible members, such as hoses.

In the solid-state laser device 101 of the second embodiment, in a case where the hoses are connected to the pipes 34a and 34b, it is necessary to take into consideration a space for bending the hoses so as to be connected to the cooler. Meanwhile, in a case where a configuration in which the housing 150 is supported by fixing the base 151 to a frame having the space under the base 151 using the solid-state laser device 102 of the present embodiment is adopted, and the cooler is installed under the base 151, it is unnecessary to take into consideration a space, which is equal to or larger than the width of the base, as an installation space.

The solid-state laser devices of the above second and third embodiments includes the linear resonator in which the output mirror and the rear mirror are disposed on a straight line; the laser rod disposed on the optical path of the resonator; the optical members at least including the Q-switch; and the rod-shaped excitation light source that extends parallel to the laser rod and includes the flash lamp that emits the excitation light that excites the laser rod. The resonator, the laser rod, and the optical members are provided on a common base and are contained in the housing having the base as a portion. A holding part is provided to hold the excitation light source parallel to the laser rod on the side of the laser rod opposite to the base. The optical members including the Q-switch are disposed between the laser rod and the rear mirror. An upper end position of the output mirror is at a position lower than a lower end position of the excitation light source held by the holding part, with the base as a reference. The holding part holds the excitation light source so as to be capable of being inserted and extracted with respect to the output mirror side in the longitudinal direction of the excitation light source. Accordingly, easy replacement of the excitation light source is allowed, and downsizing can be realized more than before.

EXAMPLES

Figure 7:
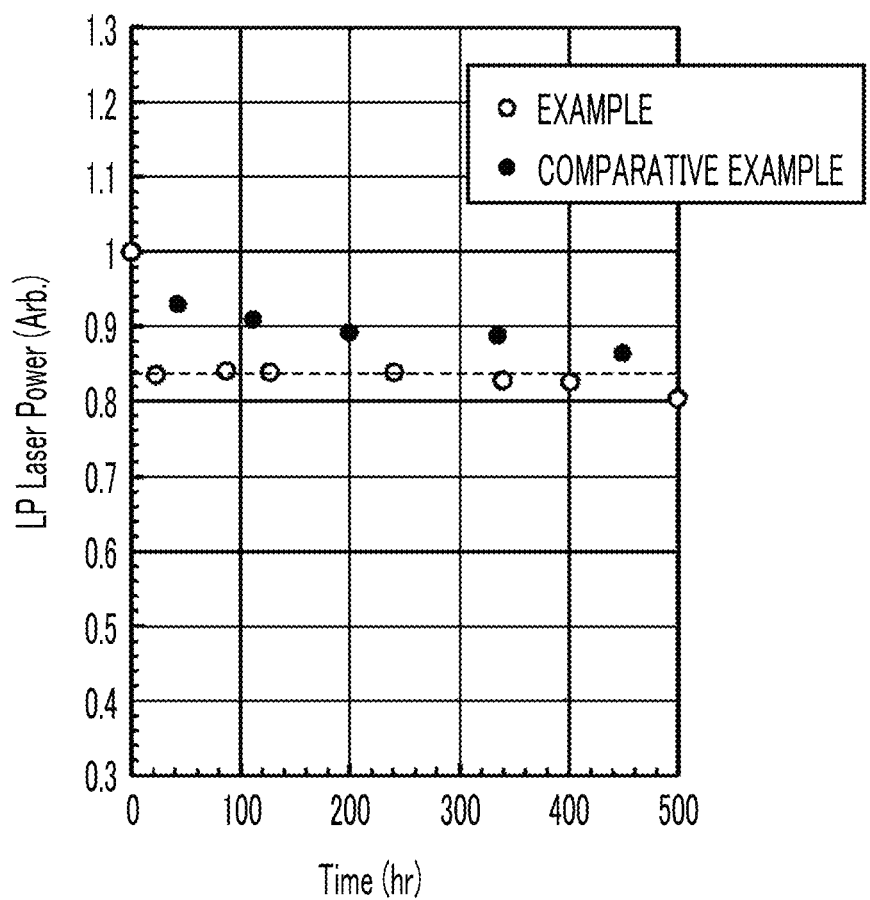
FIG. 7 is a graph illustrating time-dependent changes of laser power of an example and a comparative example.

Time-dependent changes in laser output regarding solid-state laser devices of an example and a comparative example were investigated. FIG. 7 illustrates the results.

The solid-state laser device of the example has a flash lamp using quartz glass (M382 S PLUS BY HERAEUS HOLDING GMBH), which transmits broadband light having a wavelength ranging from 400 nm to at least 2000 nm and blocks light having a wavelength of 200 nm to 300 nm, as the glass tube 12a for a lamp, in the solid-state laser device 1 of the configuration illustrated in FIGS. 1 and 2.

The solid-state laser device of the comparative example has a flash lamp using quartz glass (M382 PLUS BY HERAEUS HOLDING GMBH), which transmits broadband light having a wavelength ranging from 400 nm to 2000 nm and shows a transmittance of 25% with respect to light having a wavelength of 250 nm, as the glass tube 12a for a lamp, in the example.

The time-dependent changes in laser output in a case where shots were performed at 10 Hz for 450 to 500 hours in the devices of the respective examples are standardized and illustrated with initial values, respectively. In FIG. 7, the laser output of the comparative example decreased gradually with passage of time, whereas the laser output of the example showed a sharp decrease at the initial 25 hours (900,000 shots) degree, and then, stable output was obtained at a variation rate of less than about 5% over 400 hours or more. It is estimated that abrupt changes in the early stages of the laser output of the example are due to deterioration resulting from the ultraviolet light of the quartz glass used for the glass tube 12a for a lamp of the flash lamp, and the output is stable after passage of 25 hours because no change occur in the quartz glass. That is, it is considered that the time-dependent changes in laser output behave almost in coincidence with time-dependent changes in the transmittance of the quartz glass. The characteristics of the quartz glass are considered that, in a case where aging processing is performed for a certain time or more, variations in transmittance are less than about 5% with respect to each wavelength (for example, 400 nm) over 400 hours or more after that. In addition, here, since 25 hours are equivalent to 900,000 shots, in order to ensure stabilization, it is desirable that the 1 million shots or more are performed as the aging processing. Additionally, in order to obtain stable output over 400 hours after that, it can be said that it is desirable that the aging processing time is 110 hours or less and 4 million shots or less are performed.

The solid-state laser device of the invention is not limited in application and can be used for various applications. For example, the solid-state laser device can be preferably used as a measurement light source that generates laser light (especially, pulse laser light) to be radiated to a subject for photoacoustic wave detection in photoacoustic measurement devices described in JP2012-196430A, JP2014-207971A, and the like. Additionally, the solid-state laser device of the invention can also be applied to other devices, such as a processing device that processes a material, utilizing laser light, and an analysis device that analyzes a sample, utilizing laser light.

EXPLANATION OF REFERENCES 1, 101, 102: solid-state laser device
10: laser rod
10a: rod end part
10b: rod end face
10c: rod side surface
10d: chamfered part
11: output mirror
11a: base material
11b: reflective coating film
11e: upper end
12: flash lamp
12a: glass tube for lamp
13: rear mirror
14: reflector
15: laser chamber
16: polarizer
17: shutter
18: Q-switch
19: wedge prism pair
20: light source unit
21: terminal
23: supporting base
25 to 29: holder
30: cooler
32: cooling control unit
34a, 34b, 35a, 35b: pipe
40: hole part of reflector
42: inner wall surface (reflecting surface) of hole part
50, 60, 70: flow tube
52: first fluid flow part
54: second fluid flow part
62, 72: fluid flow part
80: housing
80a: opening
114: antireflection film
115: aperture member
115a: opening of aperture member
130: laser chamber
131: first portion (holding part)
132: second portion
133, 134: hole part
135: sealing terminal
136: O-ring
137: O-ring retaining plate
138, 139: cover member
139a: tape
150: housing
150a: first housing part
150b: second housing part 151: base
153: side wall part
155: lid part
155a: first lid
155b: second lid
156: emission opening
158: partition plate
158a: opening
160, 160A: end face protecting member
161: opening
162: opening defining part
162a: tapered part
162b: protruding portion of opening defining part
164, 164A: tubular part
L1: stimulated and emitted light
L2: laser

What is claimed is:

1. A solid-state laser device comprising:
a laser rod made of an alexandrite crystal;
a flash lamp that outputs excitation light for exciting the laser rod, a glass tube for the lamp being made of quartz glass that at least blocks deep ultraviolet light having a wavelength of 200 nm to 300 nm, and transmits visible light having a wavelength of 400 nm or more;
a laser chamber that contains a tubular reflector that includes a hole part containing at least a portion of the laser rod or a portion of the flash lamp and is made of a porous material of polytetrafluoroethylene, an inner wall surface of the hole part being a reflecting surface that reflects the excitation light,
a linear resonator in which an output mirror and a rear mirror are disposed on a straight line, the laser rod being disposed on an optical path of the resonator; and
optical members at least including a Q-switch,
wherein the resonator, the laser rod, and the optical members are provided on a common base and are contained in a housing having the base as a portion,
wherein a holding part is provided to hold the flash lamp parallel to the laser rod on a side of the laser rod opposite to the base,
wherein the optical members including the Q-switch are disposed between the laser rod and the rear mirror,
wherein an upper end position of the output mirror is at a position lower than a lower end position of the flash lamp held by the holding part, with the base as a reference, and
wherein the holding part holds the flash lamp so as to be capable of being inserted into and extracted with respect to the output mirror side in a longitudinal direction of the flash lamp.

2. The solid-state laser device according to claim 1,
wherein the glass tube for a lamp is a glass tube in which a change in transmittance of light having a wavelength of 400 nm is within 5% while 4 million shots to 14 million shots are performed in a case where the flash lamp is driven.

3. The solid-state laser device according to claim 1,
wherein the flash lamp is subjected to aging processing of 1 million shots or more.

4. The solid-state laser device according to claim 1, further comprising:
an inlet/outlet mechanism for cooling water that cools the flash lamp and the laser rod.

5. The solid-state laser device according to claim 1,
wherein the hole part of the reflector is provided with a flow tube having a first fluid flow part into which the flash lamp is inserted, and a second fluid flow part into which the laser rod is inserted,
wherein the flow tube is made of quartz glass that blocks the deep ultraviolet light having a wavelength of 200 nm to 300 nm and transmits the visible light having a wavelength of 400 inn or more.

6. The solid-state laser device according to claim 1,
wherein the hole part of the reflector is provided with a flow tube having a fluid flow part into which the flash lamp is inserted,
wherein the flow tube is made of quartz glass that blocks the deep ultraviolet light having a wavelength of 200 nm to 300 nm and transmits the visible light having a wavelength of 400 nm or more.

7. The solid-state laser device according to claim 1,
wherein the flash lamp has a columnar shape,
wherein the flash lamp and the laser rod are disposed parallel to each other in the hole part, and
wherein a difference between a shortest distance from a surface of the glass tube for a lamp of the flash lamp to the inner wall surface of the hole part and a shortest distance from a surface of the laser rod to the inner wall surface of the hole part is less than ±1 mm.

8. The solid-state laser device according to claim 1,
wherein the flash lamp is disposed in the hole part at a position where a shortest distance from a surface of the glass tube for a lamp of the flash lamp to the inner wall surface of the hole part is 5 mm or less and 1 mm or more.

9. The solid-state laser device according to claim 1,
wherein the flash lamp has a columnar shape, and the laser rod and the flash lamp satisfies $1.5\, \varphi_L \leq \varphi_F$ in a case where a diameter of the laser rod is defined $\varphi_L$ and a diameter of the flash lamp is defined as $\varphi_F$.

10. The solid-state laser device according to claim 1,
wherein the output mirror is formed such that reflective coating of a resonator surface of the output mirror is provided up to the upper end position.

11. The solid-state laser device according to claim 1,
wherein upper end positions of the Q-switch and the rear mirror are higher than the lower end position of the flash lamp held by the holding part with the base as a reference.

12. The solid-state laser device according to claim 1, further comprising:
a shutter as the optical member,
wherein the shutter is provided between the laser rod and the Q-switch, and
wherein a partition plate having an opening in the optical path is provided between the laser rod and the shutter inside the housing.

13. The solid-state laser device according to claim 1,
wherein the housing has a first housing part that houses the output mirror and the laser rod, and a second housing part that houses the rear mirror and the optical members, and
wherein the first housing part includes a first lid that opens the first housing part, the second housing part includes a second lid that opens the second housing part, and the first housing part and the second housing part are operable independently.

14. The solid-state laser device according to claim 13,
wherein a material which forming the first lid and a material which forming portions of the first housing part other than the first have linear thermal expansion coefficients of the same order.

15. The solid-state laser device according to claim 1,
wherein the holding part includes a hole part that houses the flash lamp, and has a butting structure for the flash lamp in which a power source terminal is provided at an end of the hole part on the rear mirror side.

16. The solid-state laser device according to claim 1, further comprising:
a pipe that supplies a cooling medium for cooling the flash lamp to the holding part,
wherein the pipe is disposed to extend in a direction perpendicular to the base along a side surface of the housing from a hole provided in the base and is connected to the holding part.

17. The solid-state laser device according to claim 1,
wherein the hole part of the laser chamber has a columnar shape shorter than a major-axis length of the laser rod,
wherein the laser rod is inserted through the hole part of the laser chamber, and is supported by the laser chamber in a state where both end parts of the laser rod are exposed from the hole part,
wherein an O-ring is provided at a root of at least one of both the end parts of the laser rod exposed from the hole part, and
wherein a cover member that hinders incidence of stray light generated within the housing onto the O-ring is further provided on a side surface of the laser rod closer to an end face side than the O-ring.

18. The solid-state laser device according to claim 17, further comprising:
an O-ring retaining plate between the cover member and the O-ring,
wherein the O-ring retaining plate is made of at least one of ceramics, glass, or fluororesin.

19. The solid-state laser device according to claim 1,
wherein the hole part of the laser chamber has a columnar shape shorter than a major-axis length of the laser rod,
wherein the laser rod is inserted through the hole part of the laser chamber, and is supported by the laser chamber in a state where both end parts of the laser rod are exposed from the hole part,
wherein an O-ring is provided at a root of at least one of both the end parts of the laser rod exposed from the hole part, and
wherein the O-ring is made of fluororesin.

20. The solid-state laser device according to claim 1,
wherein the laser rod has an antireflection film on an end face thereof and has a chamfered part at a peripheral edge of the end face, and
wherein an opening defining part that constitutes an opening having a diameter smaller than a diameter of an outer periphery of the end face is provided at a position that faces at least one end face of the laser rod, and an end face protecting member is provided to limit a laser light path region in the end face of the laser rod to a region inside the outer periphery of the end face.

21. The solid-state laser device according to claim 1,
wherein a distance from an optical member disposed closest to the laser rod side among the optical members to the rear mirror is shorter than a length of the flash lamp.

\* \* \* \* \*